United States Patent
Sumimoto et al.

(10) Patent No.: US 6,486,638 B1
(45) Date of Patent: Nov. 26, 2002

(54) VOLTAGE CONTROL APPARATUS OF ALTERNATOR

(75) Inventors: Katsuyuki Sumimoto; Keiichi Komurasaki, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 66 days.

(21) Appl. No.: 09/711,075

(22) Filed: Nov. 14, 2000

(30) Foreign Application Priority Data

Jun. 7, 2000 (JP) ......................................... 2000-170359

(51) Int. Cl.$^7$ ................................................. H02P 9/00
(52) U.S. Cl. ............................................ 322/28; 322/36
(58) Field of Search ............................... 322/17, 22, 23, 322/25, 27, 28, 36

(56) References Cited

U.S. PATENT DOCUMENTS

| | | | | |
|---|---|---|---|---|
| 4,379,990 A | * | 4/1983 | Sievers et al. | 322/99 |
| 4,623,833 A | * | 11/1986 | Edwards | 322/28 |
| 4,641,079 A | * | 2/1987 | Kato et al. | 320/123 |
| 5,059,886 A | * | 10/1991 | Nishimura et al. | 322/21 |
| 5,252,926 A | * | 10/1993 | Menegoli | 322/99 |
| 5,262,711 A | * | 11/1993 | Mori et al. | 320/123 |
| 5,376,876 A | * | 12/1994 | Bauser et al. | 322/28 |
| 5,448,154 A | * | 9/1995 | Kanke et al. | 322/22 |
| 5,637,985 A | * | 6/1997 | Kakizaki et al. | 322/18 |
| 5,754,030 A | * | 5/1998 | Maehara et al. | 322/19 |
| 5,929,612 A | * | 7/1999 | Eisenhaure et al. | 290/8 |

FOREIGN PATENT DOCUMENTS

JP 5-176477 7/1993

* cited by examiner

Primary Examiner—Nicholas Ponomarenko
(74) Attorney, Agent, or Firm—Sughrue Mion, PLLC

(57) ABSTRACT

In a voltage control apparatus of an alternator mounted on a vehicle, the parameter and the equation, which are established based upon the power generation characteristic and the electromagnetic specification of the alternator, are not required, and both an ON-duty rate of an ON/OFF logic of a voltage applied to an energizing coil and a logic frequency can be established under stable condition within a preselected frequency range. The alternator voltage control apparatus is arranged by employing: a first logic output means for comparing a voltage generated by the alternator with a target voltage to obtain a magnitude logic which is outputted as a first ON/OFF logic; and a second logic output means for outputting as a second ON/OFF logic, a PWM internal output logic in which an ON-duty rate is increased/decreased based on the first ON/OFF logic by an increased/decreased amount defined by considering a time constant of the energizing coil. In this alternator voltage control apparatus, a logically processed result between the first ON/OFF logic and the second ON/OFF logic is used as an ON/OFF logic of a voltage application to the energizing coil.

20 Claims, 10 Drawing Sheets

VOLTAGE CONTROL APPARATUS OF ALTERNATOR

BACKGROUND OF THE INVENTION

1. Field of the Invention

The present invention relates to a voltage control apparatus of an alternator.

2. Description of the Related Art

Conventionally, in a voltage control apparatus for controlling a voltage generated from an alternator to a predetermined value by turning ON/OFF a voltage applied to an energizing coil of this alternator, the alternator generated voltage is adjusted in a digital manner by employing a microcomputer. Such an alternator voltage control apparatus is typically known from, for example, Japanese Laid-open Patent Application No. Hei 05-176477.

In this type of conventional alternator voltage control apparatus, when the voltage generated from the alternator is controlled to the target voltage under better response characteristic, a target energizing current corresponding to a target current generated from the alternator is calculated by using an equation established based on the power generation characteristic of the alternator. Thereafter, a predicted energizing current, which may actually flow through the energizing coil, is calculated by using an equation established based upon an electromagnetic specification of the alternator.

Then, in response to deviation between the target value of the energizing current and the prediction value thereof, the target energizing current is corrected by way of the primary lead correction based upon both the power generation characteristic and the electromagnetic characteristic of the alternator, and thereafter, the control energizing current is calculated.

Furthermore, an ON/OFF duty ratio with respect to the control energizing current determined by this calculation is read out from a table which is set in accordance with the electromagnetic specification of the alternator. Then, a voltage applied to the energizing coil is controlled based on an ON/OFF duty ratio selected from a map so as to achieve the object, i.e., voltage control.

However, the above-described conventional alternator voltage control apparatus owns the following problems:

That is, in such a case that the power generation characteristic and the electromagnetic specification of the alternator are changed, or in such a case that the presently available power generation characteristic and electromagnetic specification are adapted to other electromagnetic specification and power generation characteristic of alternators, the voltage control apparatus is required to change the ON/OFF duty tables corresponding to the control energizing currents, and the coefficients of the calculating equations for the energizing currents, every time the electromagnetic specification and the power generation characteristic of the alternator are selected. Thus, this alternator voltage control apparatus must again establish the matching conditions.

SUMMARY OF THE INVENTION

The present invention has been made to solve the above-explained problems, and therefore has an object to provide an alternator voltage control apparatus in such a case that the alternator is controlled so as to control a generated voltage thereof to a target voltage in a feedback manner, while this alternator voltage control apparatus does not need to employ a parameter and an equation, which are established based upon a power generation characteristic and also an electromagnetic specification of this alternator. That is to say, even when any change is made in the power generation characteristic and also in the electromagnetic specification of the alternator, both the parameter and the equation required in the voltage control apparatus does not need to be changed.

To achieve the above-described object, according to a first aspect of the present invention, a voltage control apparatus of an alternator is characterized by such a voltage control apparatus of an alternator, for controlling a voltage generated by the alternator to a predetermined voltage value by turning ON/OFF a voltage applied to an energizing coil of the alternator, comprising: first logic output means for comparing the voltage generated by the alternator with a target voltage to obtain a magnitude logic which is outputted as a first ON/OFF logic; and second logic output means for outputting as a second ON/OFF logic, a PWM internal output logic in which an ON-duty rate is increased/decreased based on the first ON/OFF logic by an increased/decreased amount defined by considering a time constant of the energizing coil; wherein: a logically processed result between the first ON/OFF logic and the second ON/OFF logic is used as an ON/OFF logic of a voltage application to the energizing coil.

With employment of the above-described arrangement, the alternator voltage control apparatus owns the following effect. That is, in such a case that the alternator is controlled so as to control the generated voltage thereof to the target voltage in the feedback manner, this alternator voltage control apparatus does not need to employ the parameter and the equation, which are established based upon the power generation characteristic and also the electromagnetic specification of this alternator. Also, while both the ON-duty rate of the ON/OFF logic of the voltage application to the energizing coil and the logic frequency can be stabilized within a predetermined frequency range, these ON-duty rate and the logic frequency can be set with having compatibility.

According to a second aspect of the present invention, in the first aspect of the present invention, the alternator voltage control apparatus is characterized in that the target voltage is hysteresis-corrected along a direction to hold a magnitude logic obtained by comparing the target voltage with the generated voltage of the alternator; the hysteresis correction amount is changed based on a parameter related to an alternator rotation number and an alternator output strength; and also the hysteresis correction amount is changed in a feedback manner based on an inversion period of the first ON/OFF logic.

With employment of the above-described arrangement, the alternator voltage control apparatus owns the following effect. That is, the target voltage is hysteresis-corrected in order that the once determined logic is not immediately inverted. Such a hysteresis-correction can be carried out with respect to all possible operation conditions of the alternator.

According to a third aspect of the present invention, in the first aspect of the present invention, the alternator voltage control apparatus is characterized in that the first logic output means is provided with logic inversion suppressing means by which the first ON/OFF logic is hardly inverted; a suppression strength of the logic inversion suppressing means for an ON logic to an OFF logic is made different from a suppression strength of the logic inversion suppressing means for an OFF logic to an ON logic; and the suppression strengths are changed in a feedback manner in response to a resulting logic period of the first ON/OFF logic.

With employment of the above-described arrangement, the alternator voltage control apparatus owns the following effect. That is, the target voltage is hysteresis-corrected in order that the once determined logic is not immediately inverted. Such a hysteresis-correction can be carried out with respect to all possible operation conditions of the alternator.

According to a fourth aspect of the present invention, in the first aspect of the present invention, the alternator voltage control apparatus is characterized in that the logic period of the PWM internal output which constitutes the second ON/OFF logic is changed by executing a calculation based on the parameter related to both the alternator rotation number and the alternator output strength and by retrieving a content of a table; or is changed based on the period of the first ON/OFF logic.

With employment of the above-described arrangement, the alternator voltage control apparatus owns the following effect. That is, the frequency of the first ON/OFF logic can be firmly set.

According to a fifth aspect of the present invention, in the first aspect of the present invention, the alternator voltage control apparatus is further comprised of: storage means for storing thereinto a plurality of alternator generated voltages as sampling values, which have been sampled in the past; and calculation means for performing a move average calculation based on the latest sampling value and the plural past sampling values to interpret the move-averaged sampling value as a presently generated voltage; a total referring number of the past sampling values is changed based on the alternator rotation number and the alternator output strength; the total referring number of the past sampling values used in said move average calculation is equal to power of 2; and a total number of referring sampling values is interpreted by a binary number so as to obtain a section average value by bit-shifting only along the right direction by the total referring number.

With employment of the above-described arrangement, the alternator voltage control apparatus owns the following effect. That is, the section average value can be essentially obtained by employing the software filter, while a complex filter circuit such as a differential filter and an integral filter is no longer required. Also, since the filter strength of this software filter is adjusted under optimum condition based upon the output strength and the rotation number of the alternator, the feedback control operation can be carried out in a higher speed than that of the conventional alternator voltage control apparatus.

According to a sixth aspect of the present invention, in the first aspect of the present invention, the alternator voltage control apparatus is characterized in that the generated voltage of the alternator is sampled by a sampling operation whose sampling period is changed.

With employment of the above-described arrangement, the alternator voltage control apparatus owns the following effect. That is, the effective voltage generated by the alternator can be firmly obtained.

According to a seventh aspect of the present invention, in the sixth aspect of the present invention, the alternator voltage control apparatus is characterized in that the sampling period is calculated based upon the alternator rotation number, or retrieved with the content of the table.

With employment of the above-described arrangement, the alternator voltage control apparatus owns the following effect. That is, the effective voltage generated by the alternator can be firmly obtained.

According to an eighth aspect of the present invention, in the sixth aspect of the present invention, the alternator voltage control apparatus is characterized in that the sampling operation is commenced by triggering the generation timing of the voltage waveform for one stator phase of the alternator; the sampling operation is intermittently carried out in a predetermined time period only for a predetermined time duration after the commencement of the sampling operation; and both the predetermined time period and the predetermined time duration are calculated based upon the trigger interval up to now, or are determined by retrieving a content of a table.

With employment of the above-described arrangement, the alternator voltage control apparatus owns the following effect. That is, the density of the sampling process operation is reduced while the program of the microcomputer is executed, so that the computer program can be readily developed. This alternator voltage control apparatus can contribute to the fact that both the microcomputer and the crystal oscillator can be made in low cost since the frequency of the operation clock can be lowered.

According to a ninth aspect of the present invention, in the second aspect of the present invention, the alternator voltage control apparatus is further comprised of: calculation means for calculating the alternator rotation number based upon a time interval of a transition edge from "Low" to "High" of a voltage waveform for a stator 1-phase of the alternator.

With employment of the above-described arrangement, the alternator voltage control apparatus owns the following effect. That is, since the FV converting operation is carried out, the rotation number of the alternator does not need to be interpreted.

According to a tenth aspect of the present invention, in the first aspect of the present invention, the alternator voltage control apparatus is characterized in that the target voltage is shifted by an amount conducted by retrieving a content of a table and by executing a calculation based upon a parameter related to an alternator rotation number and an alternator output strength; or the target voltage is regularly corrected based upon deviation between a voltage appearing at an alternator output terminal, a voltage appearing at an external signal input terminal, and information indicative of a battery voltage derived from an external unit.

With employment of the above-described arrangement, the alternator voltage control apparatus owns the following effect. That is, the voltage appearing at the battery terminal is not lowered, and the battery voltage can be brought into the stable condition.

According to an eleventh aspect of the present invention, in the first aspect of the present invention, the alternator voltage control apparatus is characterized in that increasing/decreasing of an ON-duty rate of a PWM internal output which constitutes the second ON/OFF logic is suppressed based on an increase/decrease amount per unit time, defined by considering a time constant of the energizing coil; a suppression strength of the increase amount per unit time is set stronger than the time constant of the energizing coil; and further is changed, or prohibited based upon the alternator rotation number; the suppression of the increase/decrease amount per unit time is prohibited, or released based on a specific power generation mode of the alternator; and both an upper limit value and a lower limit value are set to the ON-duty rate based upon the alternate rotation number and the unit temperature.

With employment of the above-described arrangement, the alternator voltage control apparatus owns the following effect. That is, the hunting operation of the ON-duty rate of the second ON/OFF logic can be eliminated, and a so-called LRC function can be achieved by suppressing the increase of the ON duty rate. Then, since the upper limit value of the ON-duty rate is set, the electromagnetic sound and also the drive torque can be suppressed. Furthermore, since the lower limit value of the ON-duty rate is set, the floating control operation can be carried out.

According to a twelfth aspect of the present invention, in the first aspect of the present invention, the alternator voltage control apparatus is characterized in that the ON/OFF logic of the voltage application to the energizing coil is forcibly set to the logic ON based upon either a peak voltage or an average voltage of voltage waveforms for a stator 1-phase of the alternator irrespective of the logically processed result between the first ON/OFF logic and second ON/OFF logic.

With employment of the above-described arrangement, the alternator voltage control apparatus owns the following effect. That is, this alternator voltage control apparatus can perform a so-called floating control operation in which even in such a condition that the battery voltage is higher than the target voltage of the alternator and also the alternator does not need to generate the electric power, this alternator generates the electric power to some extent.

According to a thirteenth aspect of the present invention, in the first aspect of the present invention, the alternator voltage control apparatus is characterized in that either a multiplied value or an ON-logic rate per unit time of the ON/OFF logic of the voltage application to the energizing coil is interpreted as an ON-duty rate of the voltage application to the energizing coil; and, the multiplied value is obtained from an ON-logic rate within one logic period of the first ON/OFF logic and also an ON-logic rate within one logic period of the second ON/OFF logic.

With employment of the above-described arrangement, the alternator voltage control apparatus owns the following effect. That is, the ON-duty rate of the voltage application to the energizing coil can be readily recognized.

According to a fourteenth aspect of the present invention, in the thirteenth aspect of the present invention, the alternator voltage control apparatus is further comprised of: calculation means for calculating an effective voltage applied to the energizing coil based upon the ON-duty rate of the voltage application to the energizing coil and a voltage generated from the alternator at this time.

With employment of the above-described arrangement, the alternator voltage control apparatus owns the following effect. That is, this alternator voltage control apparatus can contribute to the fact that the precision of predicting the output strength of the alternator and the drive torque thereof is increased.

According to a fifteenth aspect of the present invention, in the first aspect of the present invention, the alternator voltage control apparatus is characterized in that both an output strength of the alternator and a drive torque strength of the alternator are predicted by retrieving a content of a table or by performing a calculation, while using an upper/lower width and a voltage magnitude of a voltage ripple produced at an alternator output terminal as a parameter, by retrieving a content of a table or by executing a calculation, while using voltage deviation as a parameter, the voltage deviation between a voltage of an alternator output terminal and a voltage of an external signal input terminal, which are produced by a voltage drop of a recharging line; or by retrieving a content of a table and/or performing a calculation, while using as a parameter, an ON-duty rate of the voltage application to the energizing coil, a converted voltage applied to the energizing coil, and the alternator rotation number.

With employment of the above-described arrangement, the alternator voltage control apparatus owns the following effect. That is, the digital recognition by the external unit can be easily carried out, and also both the software and the hardware can be readily developed. Further, when the frequency is standardized in the same product, the compatibility on the digital recognition can be established.

According to a sixteenth aspect of the present invention, in the first aspect of the present invention, the alternator voltage control apparatus is further comprised of: PWM output means for indicating an ON-duty rate of a voltage applied to the energizing coil, an effective voltage applied to the energizing coil, an output strength of the alternator, a drive torque strength of the alternator, or such an ON-duty rate which depends upon a rate of an energizing current itself of the energizing coil and an absolute value of the energizing current.

With employment of the above-described arrangement, the alternator voltage control apparatus owns the following effect. That is, the digital recognition by the external unit can be easily carried out, and also both the software and the hardware can be readily developed. Further, when the frequency is standardized in the same product, the compatibility on the digital recognition can be established.

According to a seventeenth aspect of the present invention, in the sixteenth aspect of the present invention, the alternator voltage control apparatus is characterized in that the output of the PWM output means contains a predetermined basic frequency; the predetermined basic frequency is changed based upon self-diagnostic information of the voltage control apparatus; even when the basic frequency is changed, the ON-duty rate indicated when the basic frequency is present is not changed; or even when the basic frequency is changed, there is no change in ON time defined by the ON-duty rate indicated when the basic frequency is present.

With employment of the above-described arrangement, the alternator voltage control apparatus owns the following effect. That is, since only the frequency of the PWM output and either the ON-duty rate or the ON time are monitored, both the information related to the alternator drive torque and the diagnostic information of the voltage control apparatus can be acquired at the same time.

According to an eighteenth aspect of the present invention, in the first aspect of the present invention, the alternator voltage control apparatus is further comprised of: an interface used to recognize a voltage related to a battery voltage, and an instruction of the target voltage to an external unit based on a frequency of a pulse signal supplied from the external unit, or both the frequency and a duty.

With employment of the above-described arrangement, the alternator voltage control apparatus owns the following effect. That is, the target voltage of the alternator can be changed by the external unit. Also, both the battery voltage and the target voltage can be instructed by the external unit.

According to a nineteenth aspect of the present invention, in the first aspect of the present invention, the alternator voltage control apparatus is characterized in that a power supply interrupt of the voltage control apparatus is executed by judging such a fact that the alternator continues an initial energizing condition for a predetermined time period, or such a fact that the alternator continues the initial energizing condition for a predetermined time period and further an alternator rotation number is equal to zero.

With employment of the above-described arrangement, the alternator voltage control apparatus owns the following effect. That is, no longer such a trigger means is employed which is dedicated to interrupt the power supply of the voltage control apparatus.

According to a twentieth aspect of the present invention, in the first aspect of the present invention, the alternator voltage control apparatus is characterized in that an initiation of a power supply of the voltage control apparatus is executed by using as a trigger, a logic inversion of an information communication line connected to an external unit.

With employment of the above-described arrangement, the alternator voltage control apparatus owns the following effect. That is, no longer such a trigger means is employed which is dedicated to start up the power supply of the voltage control apparatus.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Figure 1:
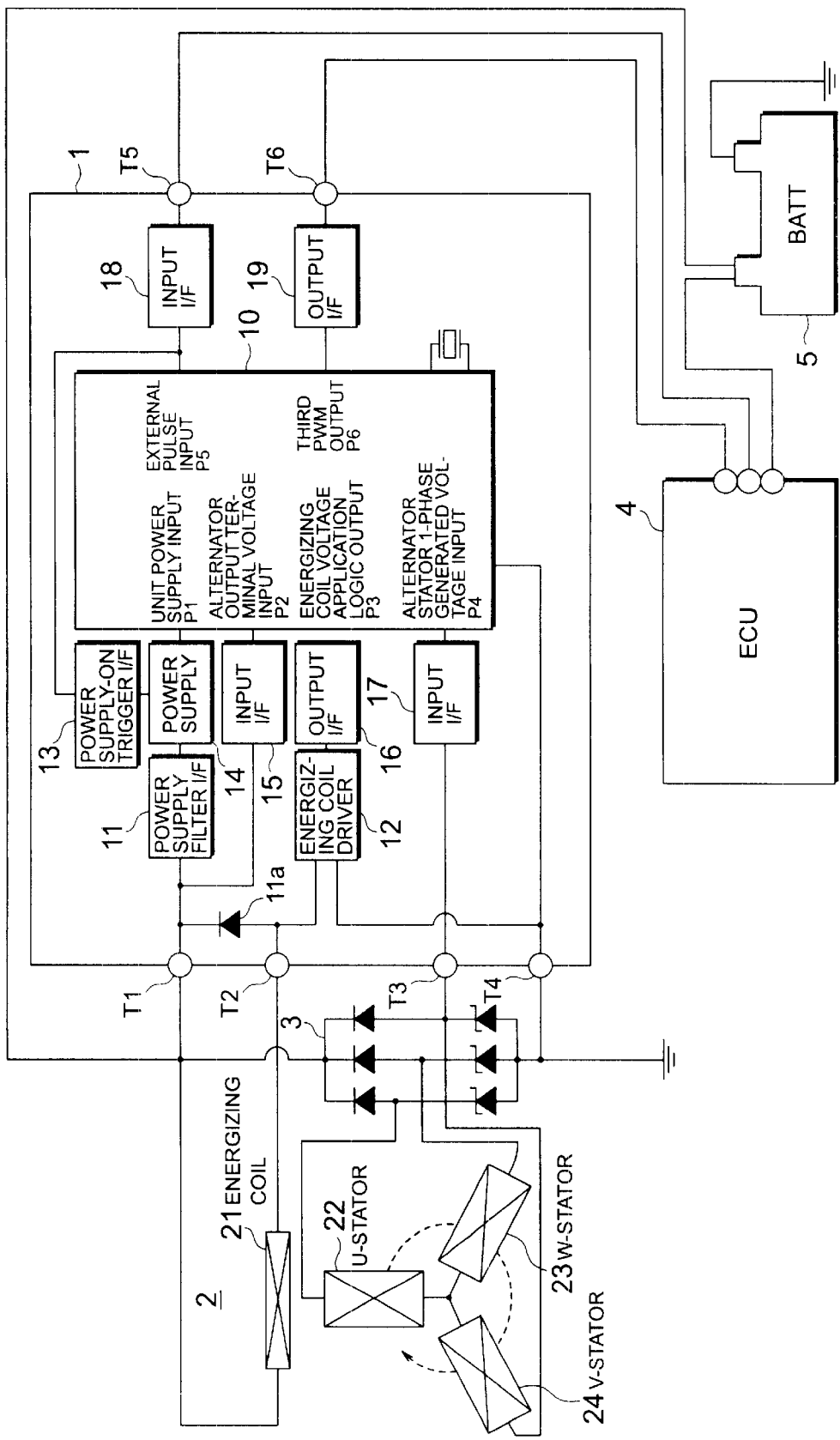
FIG. 1 is a structural diagram for schematically indicating a voltage control apparatus of an alternator according to embodiment 1 of the present invention.

Before describing various preferred embodiments of the present invention, a basic idea of an alternator voltage control apparatus according to the present invention will now be explained.

The basic idea of the present invention is directed to a digital regulation system in which a voltage regulator employs a microcomputer, and this voltage regulator controls a generated voltage of an alternator to a preselected voltage value by turning ON/OFF a voltage applied to an energizing coil. In this digital regulation system, while a magnitude relationship logic acquired by comparing a target voltage with the voltage generated by the alternator is set as first ON/OFF logic, logic of a PWM internal output is set as second ON/OFF logic, in which an ON duty rate is increased/decreased based upon the first ON/OFF logic in response to an increase/decrease amount defined by an energizing coil time constant. Then, an AND-processed calculation result obtained from the first ON/OFF logic and the second ON/OFF logic is set as ON/OFF logic used to apply a voltage to the energizing coil, which constitutes a final control means.

Also, the target voltage is hysteresis-corrected along a direction capable of holding the magnitude relationship logic acquired by comparing the target voltage with the voltage generated by the alternator. Then, this hysteresis correction amount may be changed in response to a parameter related to an alternator rotation number and an alternator output strength, and alternatively is changed in a feedback manner based upon an inverted period of the first ON/OFF logic.

Also, a suppressing means(logic inversion suppressing means) capable of hardly inverting the first ON/OFF logic is applied to the first ON/OFF logic. The suppression strength given to the ON logic-to-OFF logic is made different from the suppression strength given to the OFF logic-to-ON logic. More specifically, the suppression strength given to the ON logic-to-OFF logic is weakened so as to prevent an overshoot phenomenon occurred in the voltage generated from the alternator. Furthermore, the suppression strength is changed based upon the alternator rotation number and the alternator generation strength, and alternatively is changed in a feedback manner based upon a resulting logic period of the first ON/OFF logic.

Also, the logic period of the PWM internal output(2) which constitutes the second ON/OFF logic is changed based upon a calculation obtained from a parameter related to the alternator rotation number and the alternator output strength, or by retrieving a content of a table. Alternatively, this logic period is changed based upon the period of the first ON/OFF logic.

Also, while the sampled alternator generated voltages have been acquired several times up to now to be stored, a move average calculation is carried out based upon the latest sample value and the past sample values acquired several times, so that the move-averaged voltage is interpreted as a present alternator-generated voltage. A total reference number of the past sample values acquired several times is changed based upon the alternator rotation number and the alternator output strength. A total number of samples used to carry out the move average calculation is equal to a value obtained by multiplying power of 2 (2, 4, 8, 16, . . . ). While a total number of referring samples is interpreted by a binary number, a section average value is obtained by shifting a plurality of bits equal to this total sample number only along the right direction.

Also, in order to avoid a synchronization between the sampling period and a ripple period of a generated voltage, the original sampling period is intentionally changed to obtain a new sampling period. The generated voltage of the alternator is sampled based on this new sampling period.

Also, the sampling period is calculated based upon the alternator rotation number, or retrieved with the table operation. This sampling operation is commenced by triggering the generation timing of the voltage waveform for one stator phase of the alternator, and then, is interruptedly carried out in a predetermined time period of only for a preselected time duration after the commencement of the sampling operation. Both predetermined time duration and preselected time period are calculated based upon the trigger interval up to now, or are determined by the table retrieving operation.

Also, the digital regulation system is provided with a means for calculating the alternator rotation number based upon a time interval of a transition edge from Low to High in a voltage waveform for a stator 1-phase of the alternator.

Also, the target voltage is shifted by an amount conducted by a calculation or a table retrieving operation based on a parameter related to the alternator rotation number and the alternator output strength. Alternatively, the target voltage is regularly corrected based upon deviation between an output terminal voltage of the alternator and an input terminal voltage of an external signal, or deviation with respect to information indicative of a battery voltage supplied from an external unit.

Also, the ON duty rate of the PWM internal output which constitutes the second ON/OFF logic is increased/decreased by suppressing an increase/decrease amount per unit time, taking account of the time constant of the energizing coil. In particular, the suppression strength of the increase per unit time is strongly set, as compared with the time constant of the energizing coil. Furthermore, the suppression strength of the increase amount per unit time is changed or prohibited based upon the alternator rotation number. The increase/decrease amount per unit time is prohibited to be suppressed, or the suppression of this increase/decrease amount is released in accordance with a specific generation mode (initial energizing operation, power generation delay, suppression of temporary power generation strength) of the alternator. Both an upper limit value and a lower limit value are set to the ON duty rate based upon the alternator rotation number and the unit temperature.

Also, the ON/OFF logic of the voltage applied to the energizing coil is forcibly and logically turned ON based upon either a peak voltage or an average voltage of a voltage waveform for one stator phase of the alternator irrespective of the AND-gated calculation result between the first ON/OFF logic and the second ON/OFF logic.

A multiplication value obtained between an ON logic rate within one logic period of the first ON/OFF logic and an ON logic rate within one logic period of the second ON/OFF logic, or an ON logic rate per unit time of a final ON/OFF logic of the voltage applied to the energizing coil is interpreted as an ON duty rate of the voltage applied to the energizing coil. Also, an effective voltage applied to the energizing coil is calculated based upon the ON duty rate of the voltage applied to the energizing coil, and the voltage generated by the alternator at this stage, namely an application voltage of the energizing coil during the ON logic.

Also, the output strength of the alternator and the drive torque strength of the alternator are predicted by executing such a calculation or a table retrieving operation, while using as a parameter, an upper/lower width of a voltage ripple and a voltage height of this voltage ripple produced at the alternator output terminal. Alternatively, both the alternator output strength and the alternator drive torque strength are predicted by executing such a calculation or a table retrieving operation, while using as a parameter, a voltage deviation between a voltage at an external signal input terminal and an alternator output terminal voltage produced by a voltage drop produced in a recharging line, or using as a parameter, an ON duty rate of a voltage applied to the energizing coil, a converted voltage which is applied to the energizing coil, and the alternator rotation number.

The digital regulation system is provided with a third PWM output means. This PWM output means indicates the ON duty rate of the voltage applied to the energizing coil, the effective voltage applied to the energizing coil, the alternator output strength, the alternator drive torque strength, otherwise, such an ON duty rate defined depending upon a rate of an energizing current itself, or an absolute value thereof.

While the third PWM output owns a preselected basic frequency, the digital regulation system is provided with a means for changing this basic frequency based upon self-diagnostic information of the voltage regulator. Even when the frequency is changed, there is no change in the ON duty rate indicated during the basic frequency (namely, ON time is changed). Otherwise, even when the frequency is changed, there is no change in the ON time defined by the ON duty rate represented during the basic frequency (namely, ON duty rate is changed since the ON time is continuously identical to each other).

Also, the digital regulation system employs an interface which is used to recognize an instruction to an external unit as to a voltage related to a battery voltage or a target voltage based upon a frequency of an externally supplied pulse signal, or both a frequency and a duty ratio.

Also, in the digital regulation system, when the alternator continues to maintain the initial energizing condition for a predetermined time period, or when the alternator continue to maintain the initial energizing condition and it is so judged that the alternator rotation number becomes zero, the power interruption of the regulator is carried out. Further, the power supply initiation of the voltage regulator (namely, start of the operation of the voltage regulator) triggers to logically invert an information communication line connected to the external unit.

Also, in order to store a self-diagnostic result, a history of life experience temperatures etc., a storage means constituted by a flash ROM is provided with a voltage control apparatus. Alternatively, the voltage control apparatus is provided with such an element that when a voltage is applied to this element, this element changes its color due to a certain chemical reaction, and once this element chemically reacts, the changed color is not returned to the original color.

Also, in order that an alternator may be developed in a high efficiency as to developing time and developing cost, a replacement evaluation executed by a microcomputer digital regulator is interposed in a developing stage for an analog regulator applied to a product. This microcomputer digital regulator can freely set a power generation control specification for an alternator by way of software.

Furthermore, a voltage generated by an alternator is controlled to a preselected value by turning ON/OFF a voltage applied to an energizing coil.

Referring now to drawings, an embodiment of the present invention will be described.

Embodiment 1

FIG. 1 is a structural diagram for indicating a voltage control apparatus of an alternator, according to embodiment 1 of the present invention.

In this figure, a control apparatus 1 is provided with a microcomputer 10, and a plurality of terminals T1 to T6 connected to an external unit (not shown). This microcomputer 10 may be realized in the form of a microcomputer dedicated to control a power generation of an alternator, or another microcomputer contained inside an engine ECU.

A predetermined power supply voltage is applied from a power supply 14 to a unit power supply input port P1 of this microcomputer 10. This power supply 14 is also connected via a power supply filter interface (I/F) 11 to the terminal T1. The terminal T1 is connected to a B(power supply) terminal of an alternator 2, namely one terminal of an energizing coil 21. Also, a battery 5 is connected to this terminal T1.

Figure 2:
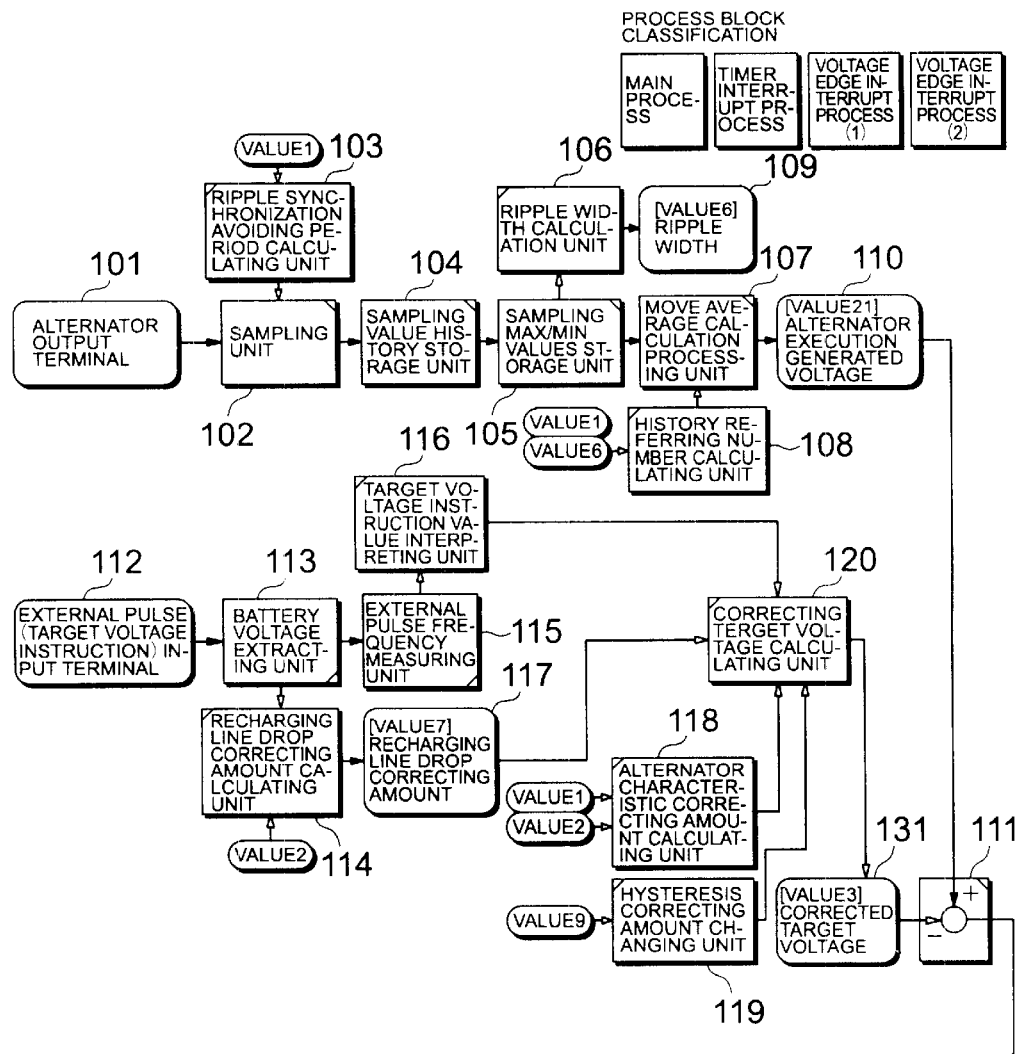
FIG. 2 is a functional block diagram for showing the voltage control apparatus of the alternator according to embodiment 1 of the present invention.
Figure 2:
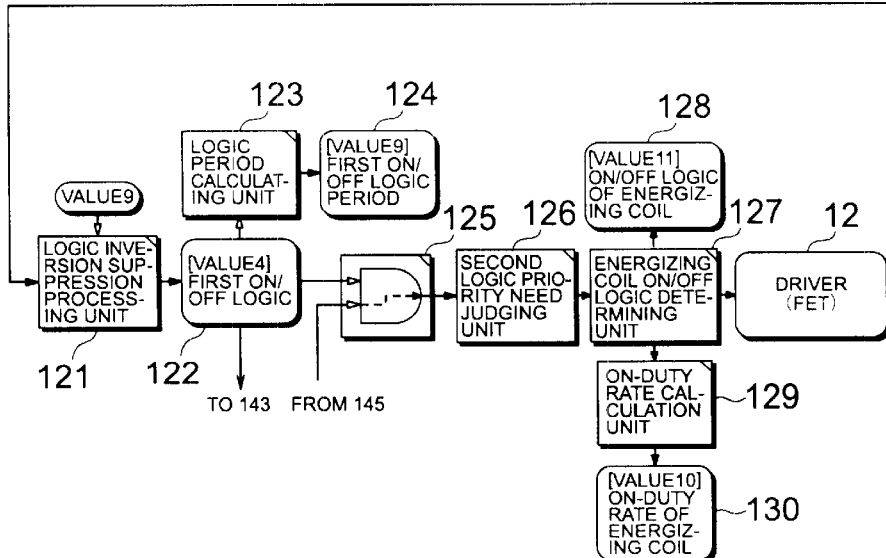
Figure 3:
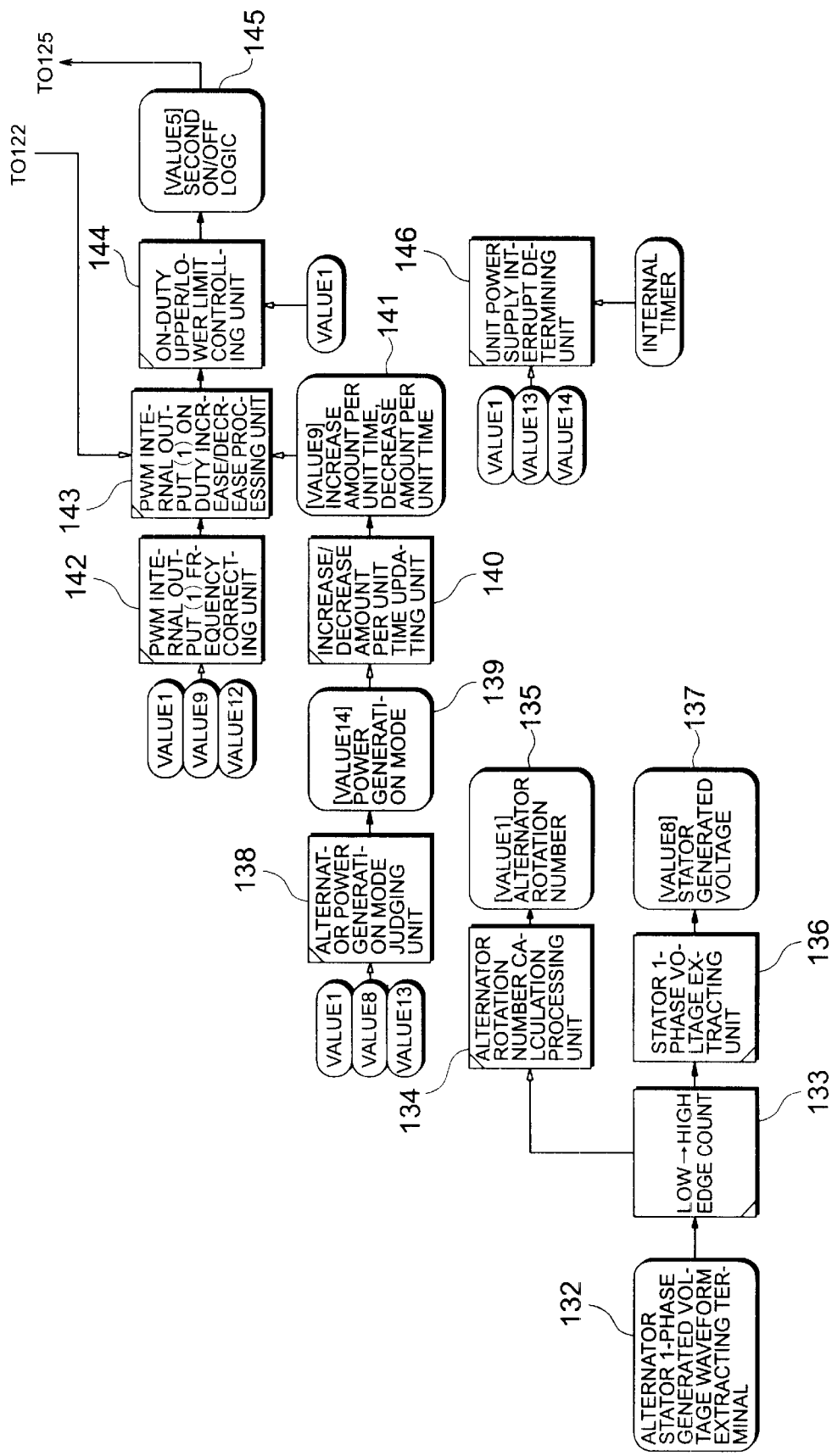
FIG. 3 is a functional block diagram for showing the voltage control apparatus of the alternator according to embodiment 1 of the present invention.

Since the microcomputer 10 may achieve the power generation control of the alternator 2 after the system initiation, the microcomputer 10 acquires a voltage generated by the alternator 2 from the terminal T1 via an input interface (I/F) 15 to an input port P2 of an alternator output terminal voltage. This input port P2 constitutes such a port used to recognize the voltage generated by the alternator 2. The microcomputer 10 processes the voltage generated by the alternator 2 acquired from the port P2 in a functional block of the power generation control as indicated in FIGS. 2 and 3 which will be explained later.

An energizing coil voltage application logic output port P3 of the microcomputer 10 is connected via an output interface (I/F) 16 to a control electrode of a switch (not shown) which constitutes an energizing coil driver 12. As this switch, a semiconductor switching element driven by either a current or a voltage, for instance, an MOSFET or a bipolar transistor is used. One major electrode of the switch is connected to the terminal T2.

The terminal T2 is connected to the other terminal (minus-side terminal) of the energizing coil 21 of the alternator 2. The ON/OFF control of the voltage applied to the energizing coil 21 of the alternator 2 is carried out by driving the switch of the energizing coil driver 12 from the port P3 of the microcomputer 10 via the output interface 16. The microcomputer 10 outputs a so-called ON/OFF duty pulse from the port P3, and then converts the ON/OFF duty pulse into either a current or a voltage by the output interface 16 so as to drive the switch of the energizing coil driver 12 by the current or the voltage.

An input port P4 of an alternator stator one-phase generated voltage provided in the microcomputer 10 is connected via an input interface (I/F) 17 to the terminal T3. This terminal T3 is connected via a rectifier circuit 3 to an one-phase output side of the stator of the alternator 2, for example, an output side of a V-phase stator 24. Also, the terminal T4 is grounded.

The microcomputer 10 acquires a V-phase voltage of the stator via the input interface 17 to the port P4 while the alternator 2 generates the voltage. The waveform of this acquired voltage is analogous to a rectangular shape. Since the microcomputer 10 measures a frequency of this acquired voltage, the microcomputer 10 may acquire a drive rotation number of the alternator 2, and if required, the circumferential ratio between a pulley of the alternator 2 and a pulley of an engine crank shaft. In other words, the microcomputer 10 may acquire an engine revolution number based upon the pulley ratio.

The terminal T5 connected to the external unit, for example, an engine control unit (ECU) 4 is connected via an input interface (I/F) 18 to the external pulse input port P5 of the microcomputer 10, and also is connected via a power supply energizing trigger interface (I/F) 13 to the power supply 14. A third PWM output port P6 of the microcomputer 10 is connected to the ECU 4 via an output interface (I/F) 19.

Figure 4:
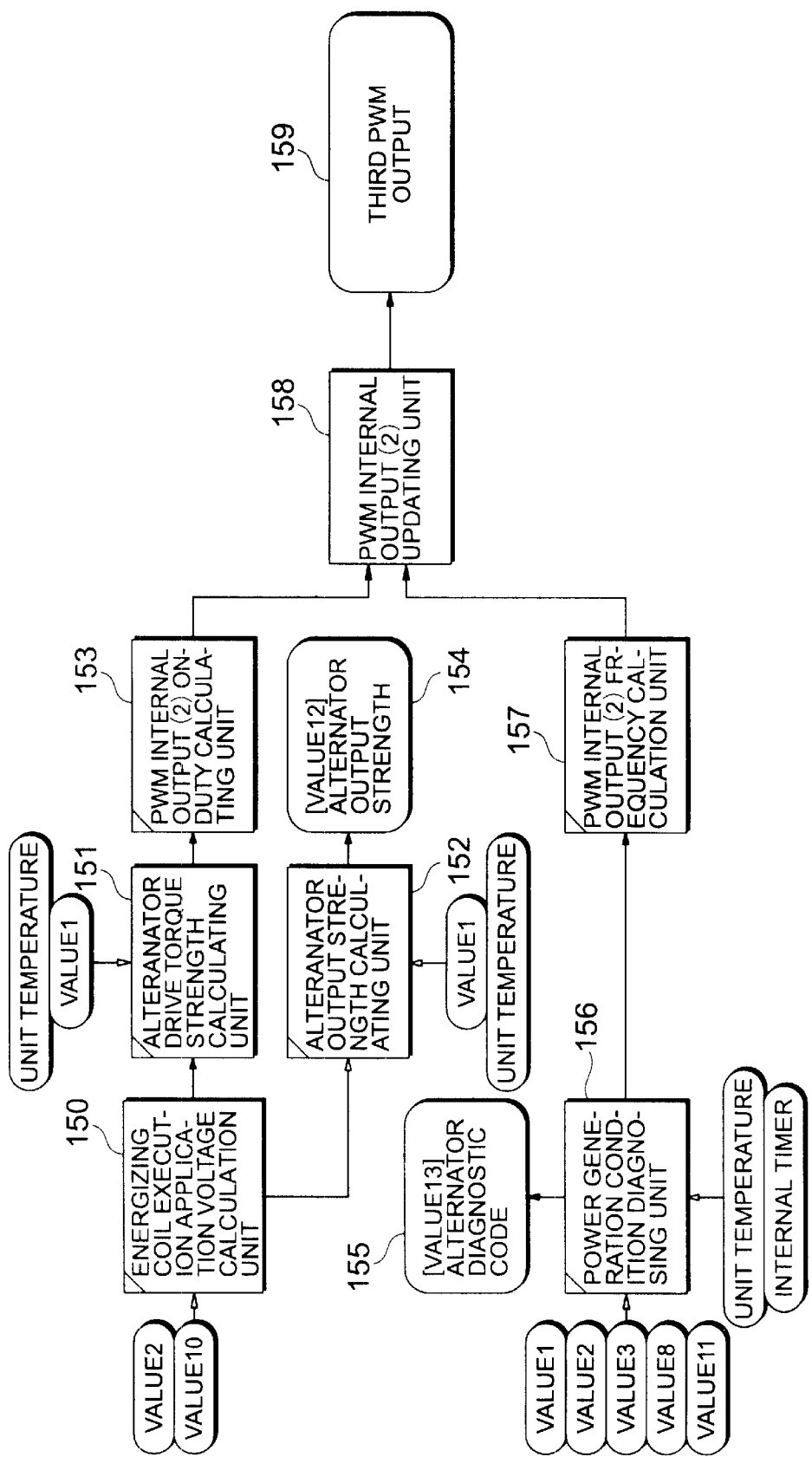
FIG. 4 is a functional block diagram for showing the voltage control apparatus of the alternator according to embodiment 1 of the present invention.

FIGS. 2 to 4 are functional block diagrams for functionally showing power generation control of the alternator 2 by the microcomputer 10.

It should be noted that the respective blocks indicated in FIG. 2 to FIG. 4 are classified into process blocks as indicated in an upper portion of FIG. 2.

First, the functions of these process blocks will be explained with reference to FIG. 2. A voltage at an alternator output terminal 101, namely at the port P2 is entered into a sampling unit 102. Also, a calculation result derived from a ripple synchronization avoiding period calculating unit 103 based upon an alternator rotation number (VALUE1)(will be explained later) is inputted from the port P4 to a sampling unit 102. The sampling result is stored into a sampling value history storage unit 104. Both a maximum value and a minimum value of the sampling results of the sampling value history storage unit 104 are stored into a sampling value MAX/MIN storage unit 105.

A ripple width calculation unit 106 calculates a ripple width of a sampling value stored in the sampling value MAX/MIN storage unit 105, and then outputs the calculated ripple width as a ripple width (VALUE6) 109. Also, a move average calculation processing unit 107 calculates an alternator effective generated voltage (VALUE2) 110 based upon the output of the sampling value MAX/MIN storage unit 105 and an output of a history referring number calculating unit 108 which executes a calculation based upon the VALUE1 and VALUE6, and then outputs this alternator effective generated voltage (VALUE2) to a subtracter 111.

Also, a battery voltage is extracted by a battery voltage extracting unit 113 from an external pulse (target voltage instruction) input terminal 112, namely the port P4, and then is applied to both a recharging line drop correcting amount calculating unit 114 and an external pulse frequency measuring unit 115. The recharging line drop correcting amount calculating unit 114 calculates a recharging line drop correcting amount (VALUE7) 117 based upon the output of the battery voltage extracting unit 113 and the alternator effective generated voltage (VALUE2) 110. Also, a target voltage instruction width interpreting unit 116 detects a target voltage instruction width from the external pulse frequency measured by the external pulse frequency measuring unit 115.

An alternator characteristic correcting amount calculating unit 118 calculates an alternator characteristic correcting amount based on the VALUE1 and a value of VALUE17 (will be explained later), and a hysteresis correcting amount changing unit 119 changes a value of VALUE9. Based upon the output from the target voltage instruction width interpreting unit 116, the output from the recharging line drop correcting amount calculating unit 114, the output from the alternator characteristic correcting amount calculating unit 118, and the output from the hysteresis correcting amount changing unit 119, a corrected target voltage calculating unit 120 calculates a corrected target voltage (VALUE3) 131, and then supplies this corrected target value (VALUE3) 131 to the subtracter 111 so as to subtract the corrected target voltage from the alternator effective generated voltage (VALUE2) 110. Then, this corrected target voltage calculating unit 120 supplies the subtraction result to a logic inverting suppression processing unit 121.

The logic inverting suppression processing unit 121 processes the entered subtraction result and the value of VALUE 9 to obtain a first ON/OFF logic value (VALUE4) 122. This first ON/OFF logic value (VALUE4) 122 is supplied to both a logic period calculating unit 123 and a PWM internal output ON-duty increase/decrease processing unit 143 (see FIG. 3). Then, the logic period calculating unit 123 obtains a first ON/OFF logic period (VALUE9) 124.

Also, the first ON/OFF logic value (VALUE4) 122 is supplied to an AND gate 125 so as to be AND-gated with a second ON/OFF logic value (VALUE5) 145 (see FIG. 3) which will be described later. The AND-gated result is supplied to a second logic priority need judging unit 126. The AND gate 125 executes the normal AND gating logic operation, namely when both the first ON/OFF logic value (VALUE4) 122 and the second ON/OFF logic value (VALUE5) 135 correspond to logic levels of "1", this AND gate 125 outputs "1". In addition to this normal AND gating logic operation, when the ON duty rate of the second ON/OFF logic value (VALUE5) is present within a preselected range, for example, a range between 10% and 90% as indicated by broken line, the AND gate 125 forcibly outputs the second ON/OFF logic value (VALUE5).

The second logic priority need determining unit 126 judges as to whether or not the second ON/OFF logic value priority is needed based upon the output derived from the AND gate 125, and then supplies the judgement result to an energizing coil ON/OFF logic determining unit 127. The energizing coil ON/OFF logic determining unit 127 determines an energizing coil ON/OFF logic based upon the input judgement result, and then drives a switch (FET) of the energizing coil driver 12 in accordance with this judgement result. At this time, the output of the energizing coil ON/OFF logic determining unit 127 is used as an ON/OFF logic value (VALUE11) 128 of the energizing coil 21, and also is supplied to an ON duty rate calculating unit 129. Then, this ON duty rate calculating unit 129 calculates an ON duty rate (VALUE10) 130 of the energizing coil 21.

Referring now to FIG. 3, functions of the voltage control apparatus will be explained.

An input signal derived from an alternator stator 1-phase generated voltage waveform extracting terminal 132, namely the port P4 is counted by an edge count circuit 133 by checking a level change from a low level to a high level. In response to this count value, an alternator rotation number calculation processing unit 134 detects an alternator rotation number (VALUE1) 135. In response to the count value of the edge count circuit 133, a stator 1-phase voltage extracting unit 136 extracts a stator generated voltage (VALUE8) 137.

Also, an alternator power generation mode judging unit 138 judges a power generation mode based upon VALUE1, VALUE8, and VALUE13 (will be discussed later). When the judgement result corresponds to the power generation mode, this alternator power generation mode judging unit 138 outputs a power generation mode (VALUE14) 139 to a unit-time increase/decrease amount updating unit 140. The output of the updating unit 140 is supplied as a unit-time increase amount and a unit-time decrease amount (VALUE9) to the PWM internal output ON-duty increase/decrease processing unit 143.

In response to VALUE1, VALUE9, and VALUE12 (will be discussed later), a PWM internal output(1) frequency correcting unit 142 corrects a frequency, and then supplies the frequency-corrected result to a PWM internal output(1) ON-duty increase/decrease processing unit 143. In this case, the PWM internal output(1) essentially represents an output (voltage controlling output) for the energizing coil. In response to this corrected frequency, and VALUE4 and VALUE9, the PWM internal output(1) ON-duty increase/decrease processing unit 143 executes the ON-duty increase/decrease processing operation. In response to VALUE1, an ON-duty upper/lower limit controlling unit 144 limits an upper limit value and a lower limit value of the ON-duty, and then outputs the limited value as a second ON/OFF logic value (VALUE5) to the AND gate 125 (FIG. 2).

Also, in response to VALUE1, VALUE13, VALUE14, and also a count value of the internal timer, a unit power supply interrupt determining unit 146 determines the interruption of the unit power supply.

Next, functions of the voltage control apparatus will now be explained with reference to FIG. 4.

An energizing coil effective applied voltage calculating unit 150 calculates an effective applied voltage of the energizing coil 21, and then supplies the calculated effective applied voltage to both an alternator drive torque strength calculating unit 151 and an alternator output strength calculating unit 152. The alternator drive torque strength calculating unit 151 calculates a drive torque strength of the alternator 2 based upon the entered effective applied voltage, VALUE1, and a unit temperature. Then, in response to the calculation result, a PWM internal output(2) ON-duty calculating unit 153 calculates an ON-duty and supplies this calculated ON-duty to the PWM internal output (2) updating unit 148. In this case, the PWM internal output(2) essentially represents a transfer of information with respect to the external unit (namely, a transfer of information to an external unit).

On the other hand, the alternator output strength calculating unit 152 calculates an alternator output strength from the input effective applied voltage, and then outputs the calculated output strength as an alternator output strength (VALUE12) 154.

Also, a power generation condition diagnosing unit 156 judges a power generation condition based upon the VALUE1, VALUE2, VALUE3, VALUE8, VALUE11, the unit temperature, and the count value of the internal timer, and thereafter outputs this diagnosed result as an alternator diagnostic code (VALUE13) to a PWM internal output(2) frequency calculating unit 157. In response to the output of the ON-duty calculating unit 153 and the output of the frequency calculating unit 157, a PWM internal output(2) updating unit 158 updates a PWM internal output(2), and then outputs the updated output as a third PWM output 159 from the port P6.

Next, a description will now be made of alternator voltage control operation by the alternator voltage control apparatus according to embodiment 1 of the present invention with reference to FIG. 5 to FIG. 9.

First, a main process operation is explained with reference to FIG. 5 and FIG. 6.

Figure 5:
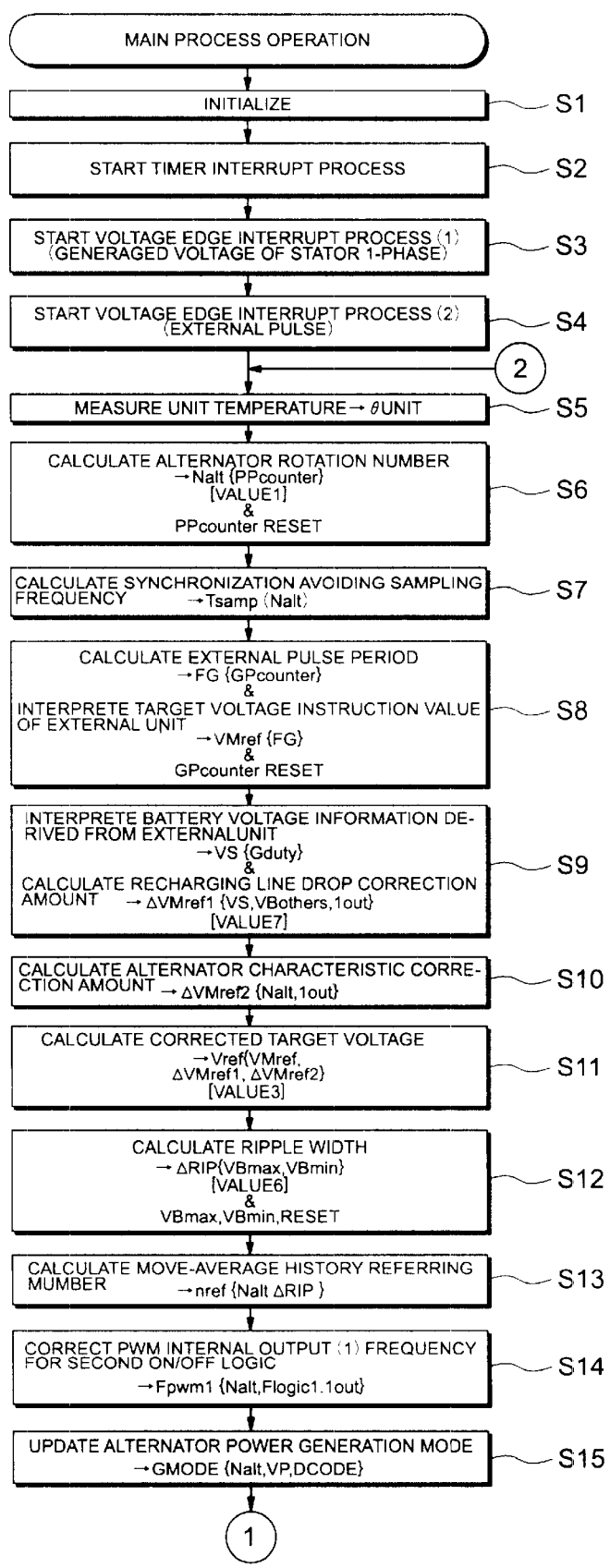
FIG. 5 is a flow chart for describing operations of the alternator voltage control apparatus according to embodiment 1 of the present invention.
Figure 6:
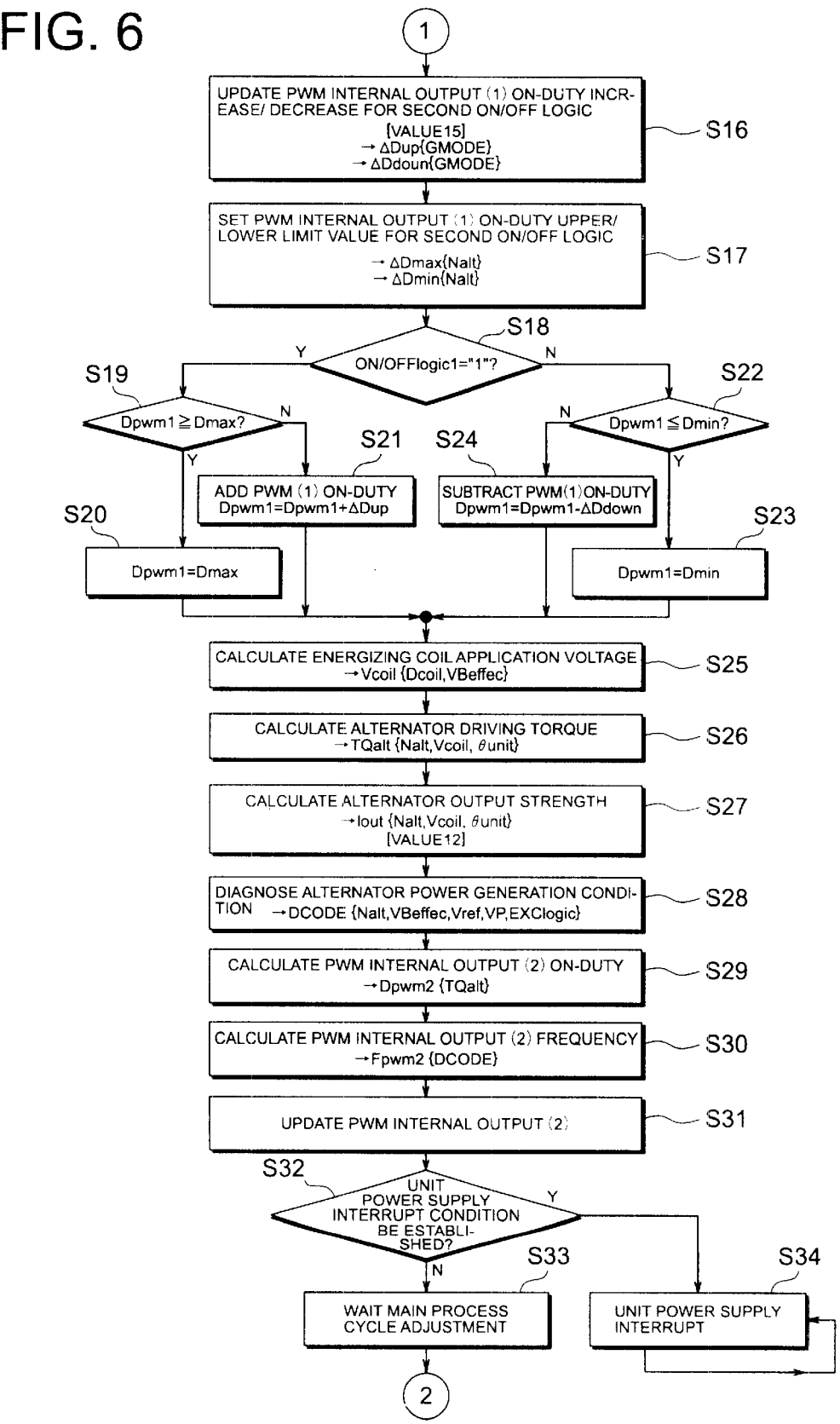
FIG. 6 is a flow chart for describing operations of the alternator voltage control apparatus according to embodiment 1 of the present invention.

At a first step S1 of the flow chart shown in FIG. 5, the voltage control operation is initialized. At a step S2, a timer interrupt process operation is commenced in order to acquire the alternator effective generated voltage (VBeffec), the maximum sampling value (VBmax), the minimum sampling value (VBmin), the logic period (Flogicl) of the first ON/OFF logic, the first ON/OFF logic (ON/OFF Flogicl), the logic (EXClogic) for energizing the energizing coil 21, and the ON-duty rate (Dcoil) of the energizing coil 21.

Next, at a step S3, a voltage edge interrupt process(1) operation is commenced so as to acquire an edge count value (PPcounter) of a stator 1-phase generated voltage from a low level to a high level, and a stator 1-phase generated voltage (VP). At a step S4, a voltage edge interrupt process(2) operation is commenced so as to acquire an edge count value (GPcounter) of an output from the ECU 4 from a low level to a high level, a voltage (VBothers1) produced when an external pulse is a high level, and an ON-duty rate (Gduty) of the external pulse.

Subsequently, the microcomputer 10 measures a unit temperature (θunit) at a step S5; calculates an alternator rotation number (Nalt) and resets the PP counter at a step S6; calculates a synchronization avoiding sampling frequency, namely a sampling period (Tsamp) at a step S7; calculates an external frequency (FG) and interprets a target voltage instruction value (ΔVMref) of the external unit at a step S8;

interprets battery voltage information (VS) supplied from the external unit and also calculates a recharging line drop correcting amount (ΔVMref1) at a step S9.

Next, the microcomputer 10 calculates an alternator characteristic correcting amount (ΔVMref2) at a step S10; calculates a corrected target voltage (Vref) at a step S11; calculates a ripple width (ΔRIA) at a step S12; calculates a move average history referring number (nref) at a step S13; corrects a PWM internal output frequency (Fpwm1) for the second ON/OFF logic at a step S14; updates an alternator power generation mode (GMODE) at a step S15; updates a PWM internal output(1) ON-duty increase/decrease amounts (Dup, Ddown) for the second ON/OFF logic at a step S16; and sets a PWM internal output (1) ON-duty upper limit value/lower limit value (Dmax, Dmin) for the second ON/OFF logic at a step S17.

Then, the microcomputer 10 judges as to whether or not the first ON/OFF logic (ON/OFFFlogic1) is equal to "1" at a step S18. When this first ON/OFF logic is "1", the microcomputer 10 judges as to whether or not the PWM internal output (1) ON-duty rate (Dpwm1) for the second ON/OFF logic is larger than the upper limit value (Dmax) at a step S19. When this PWM internal output (1) ON-duty rate is larger than the upper limit value, the microcomputer 10 sets this ON-duty rate to the upper limit value at a step S20. When this PWM internal output(1) ON-duty rate is smaller than the upper limit value, the microcomputer 10 executes the adding operation of the PWM internal output(1) ON-duty for the second ON/OFF logic, namely adds an increase portion (ΔDup) to this PMW internal output(1) ON-duty for the second ON/OFF logic at a step S21.

On the other hand, when the first ON/OFF logic (ON/OFFFlogic1) is not equal to "1" at the previous step S18, the microcomputer 10 checks as to whether or not the PWM internal output(1) ON-duty (Dpwm1) for the second ON/OFF logic is smaller than the lower limit value (Dmin) at a step S22. When this PWM internal output(1) ON-duty rate is smaller than the lower limit value, the microcomputer 10 sets this PMW internal output(1) ON-duty for the second ON/OFF logic to the lower limit value at a step S23. Conversely, when this PWM internal output(1) ON-duty rate is larger than the lower limit value, the microcomputer 10 executes a subtraction of the PMW internal output(1) ON-duty for the second ON/OFF logic, namely subtracts a decrease portion (ΔDdown) from the PMW internal output (1) ON-duty for the second ON/OFF logic at a step S24.

Next, the microcomputer 10 calculates an energizing coil effective applied voltage (Vcoil) at a step S25; calculates alternator drive torque at a step S26; and calculates an alternator output strength (Iout : VALUE12) at a step S27. Subsequently, the microcomputer 10 diagnoses an alternator power generation condition (DOOD) at a step S28; calculates a PWM internal output(2) ON-duty rate (Dpwm2) at a step S29; calculates a PWM internal output(2) frequency (Fpwm2) at a step S30; and also updates the PWM internal output(2) at a step s31.

Then, the microcomputer 10 judges as to whether or not the unit power supply interrupt condition can be established based upon the alternator rotation number (Nalt) (VALUE1), the alternator power generation condition (DOOD) (VALUE13), and the PWM internal output(1) ON-duty increase/decrease amount for the second ON/OFF logic (GMODE) (VALUE14) at a step S32. When this unit power supply interrupt condition cannot be satisfied, the microcomputer 10 executes the weighting operation to adjust the main process period at a step S33. Thereafter, the process operation is returned to the step S5 at which the microcomputer 10 executes a process operation similar to the above-explained process operation. When the unit power supply interrupt condition can be established, the microcomputer 10 interrupts the unit power supply at a step S34.

Next, a timer interrupt process operation will be described with reference to FIG. 7 and FIG. 8.

Figure 7:
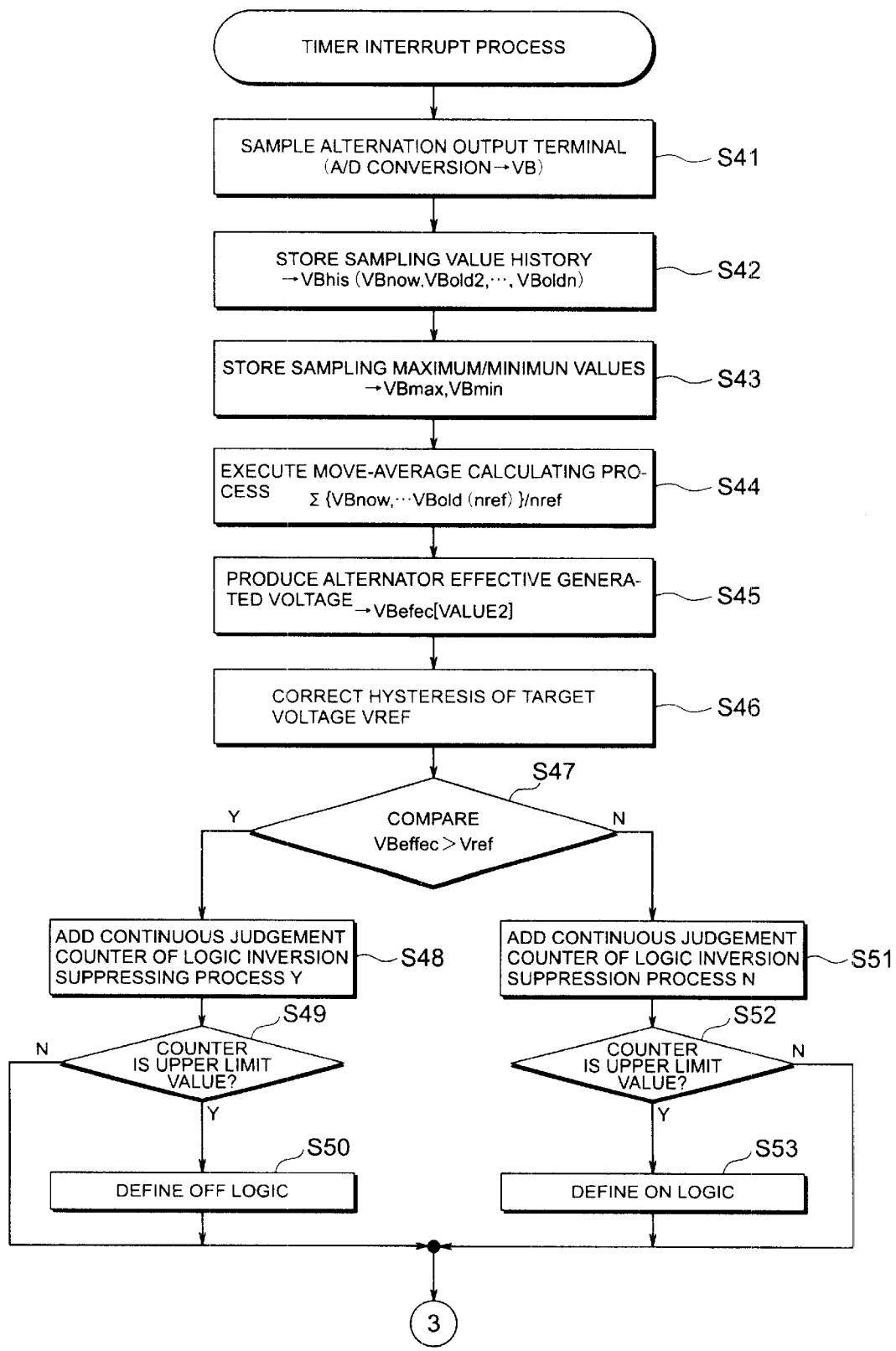
FIG. 7 is a flow chart for describing operations of the alternator voltage control apparatus according to embodiment 1 of the present invention.
Figure 8:
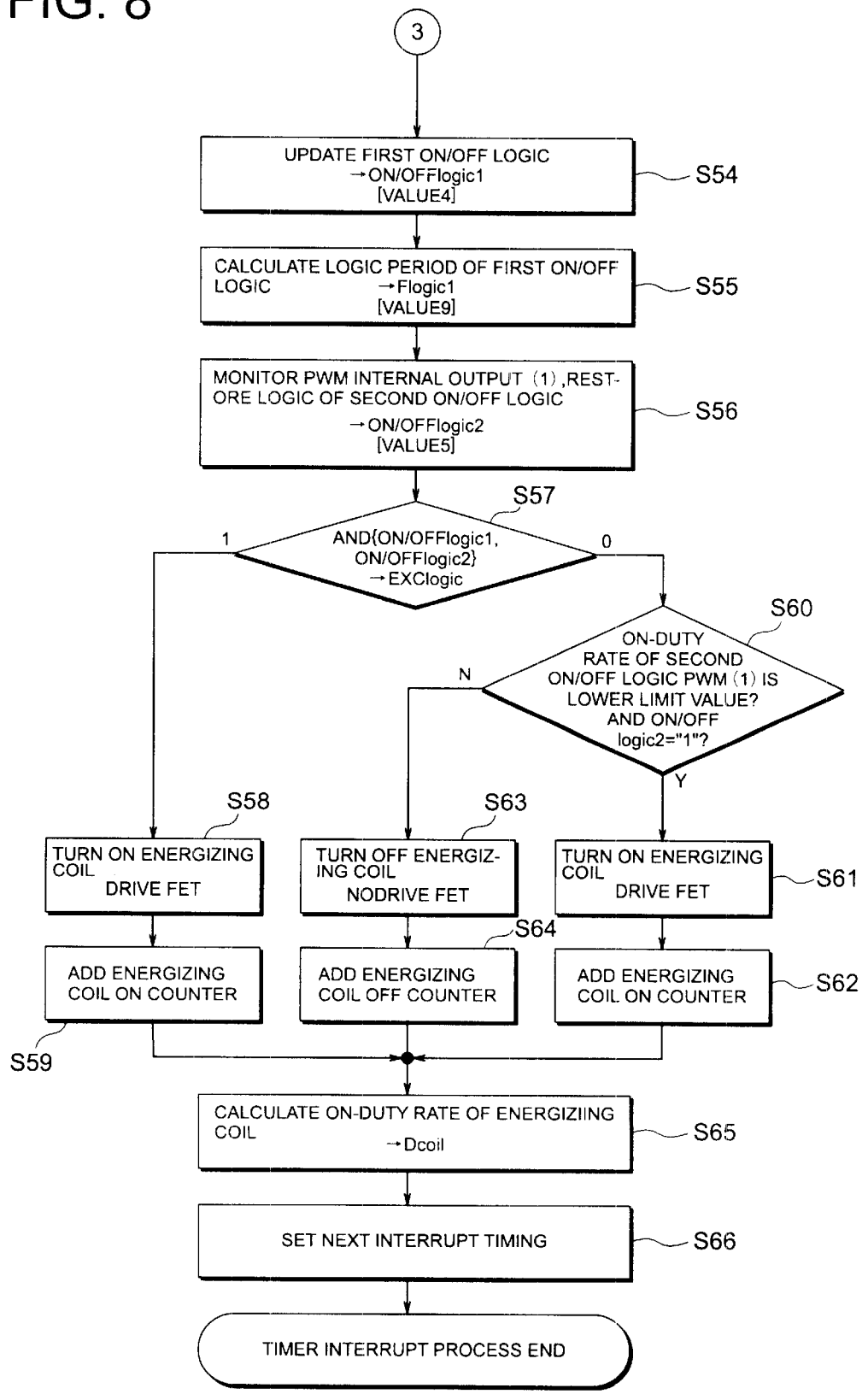
FIG. 8 is a flow chart for describing operations of the alternator voltage control apparatus according to embodiment 1 of the present invention.

In a flowchart of FIG. 7, the microcomputer 10 firstly performs the sampling operation of an alternator output at a step S41. Then, the microcomputer 10 stores a sampling value history (VBhis) at a step S42; and further stores both a maximum sampling value (VBmax) and a minimum sampling value (VBmin) at a step S43; executes a move average calculation process operation based upon a move average history referring number (nref) at a step S44 in order to acquire an alternator effective generated voltage (VBefect:VALUE2) at a step S45. Then, the microcomputer 10 corrects a hysteresis of a target voltage (Vref) based on the logic period (Flogic1:VALUE9) of the first ON/OFF logic (will be explained later) corresponding to the preceding cycle at a step S46.

Thereafter, the microcomputer 10 compares the target voltage (Vref) with the alternator effective generated voltage (VBefect) at a step S47. When the alternator effective generated voltage is higher than the target voltage, the microcomputer 10 executes both a logic inverting suppression process operation and an addition of a continuous judgement counter at a step S48, and judges as to whether or not the count value of the continuous judgement counter is reached to the upper limit value based upon the logic period of the first ON/OFF logic (Flogic1:VALUE9) at a step S49. When this count value is reached to the upper limit value, the microcomputer 10 defines the OFF logic at a step S50. Conversely, when this count value is not reached to the upper limit value, the microcomputer 10 advances the process operation to the next step S54 (see FIG. 8) without defining the OFF logic.

On the other hand, at the previous step S47, when the alternator effective generated voltage is not higher than the target voltage, the microcomputer 10 similarly executes both a logic inverting suppression process operation and an addition of a continuous judgement counter at a step S51, and judges as to whether or not the count value of the continuous judgement counter is reached to the upper limit value based upon the logic period of the first ON/OFF logic (Flogic1:VALUE9) at a step S52. When this count value is reached to the upper limit value, the microcomputer 10 defines the ON logic at a step S53. Conversely, when this count value is not reached to the upper limit value, the microcomputer 10 advances the process operation to the next step S54 (see FIG. 8) without defining the ON logic.

Next, the microcomputer 10 updates the first ON/OFF logic to set the updated first ON/OFF logic as an ON/OFFlogic1 (VALUE4) at a step S54; updates the logic period of the first ON/OFF logic as an Flogic1 (VALUE9) at a step S55; and monitors the PWM internal output(1) so as to restore the logic ON/OFFlogic2 of the second ON/OFF logic (VALUE5) at a step S56.

Then, the AND gate AND-gates the first ON/OFF logic (ON/OFFFlogic1) and the logic ON/OFFlogic2 of the second ON/OFF logic at a step S57. When the AND-gated output is equal to "1", the microcomputer 10 drives the energizing coil driver 12 (see FIG. 1) containing the FET as the switching element so as to drive (turn ON) the energizing coil 21 (see FIG. 1) at a step S58, and increments the time period for the energizing coil ON by the counter at a step S59.

On the other hand, when the AND-gated result is equal to "0" at the step S57, the microcomputer 10 judges as to whether or not the PWM internal output(1) ON-duty rate for the second ON/OFF logic is equal to the lower limit value, and also the logic ON/OFFFlogic2 of the second ON/OFF logic is equal to "1" at a step S60. If YES, then the microcomputer 10 drives the energizing coil driver 12 so as to drive (turn ON) the energizing coil 21 at a step S61 and increments the time period for the energizing coil ON at a step S62. If NO, then the microcomputer 10 stops to drive the energizing coil driver 12, so that the energizing coil 21 (see FIG. 1) is disenergized (turned OFF) at a step S63, and the microcomputer 10 increments the time period for the energizing coil OFF at a step S64.

Then, the microcomputer 10 calculates the ON-duty rate (Dcoil) of the energizing coil 21 at a step S65, and sets next interrupt timing based on the synchronization avoiding sampling frequency (Tsamp) at a step S66. Thus, the timer interrupt process is accomplished.

Figure 9:
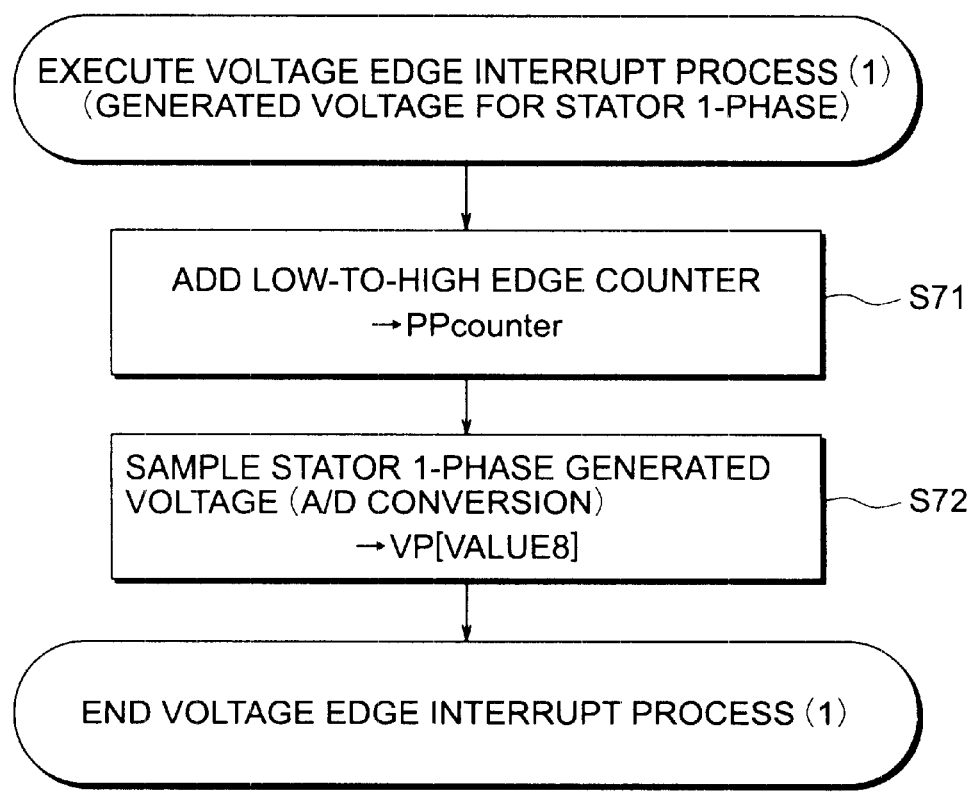
FIG. 9 is a flow chart for describing operations of the alternator voltage control apparatus according to embodiment 1 of the present invention.
Figure 10:
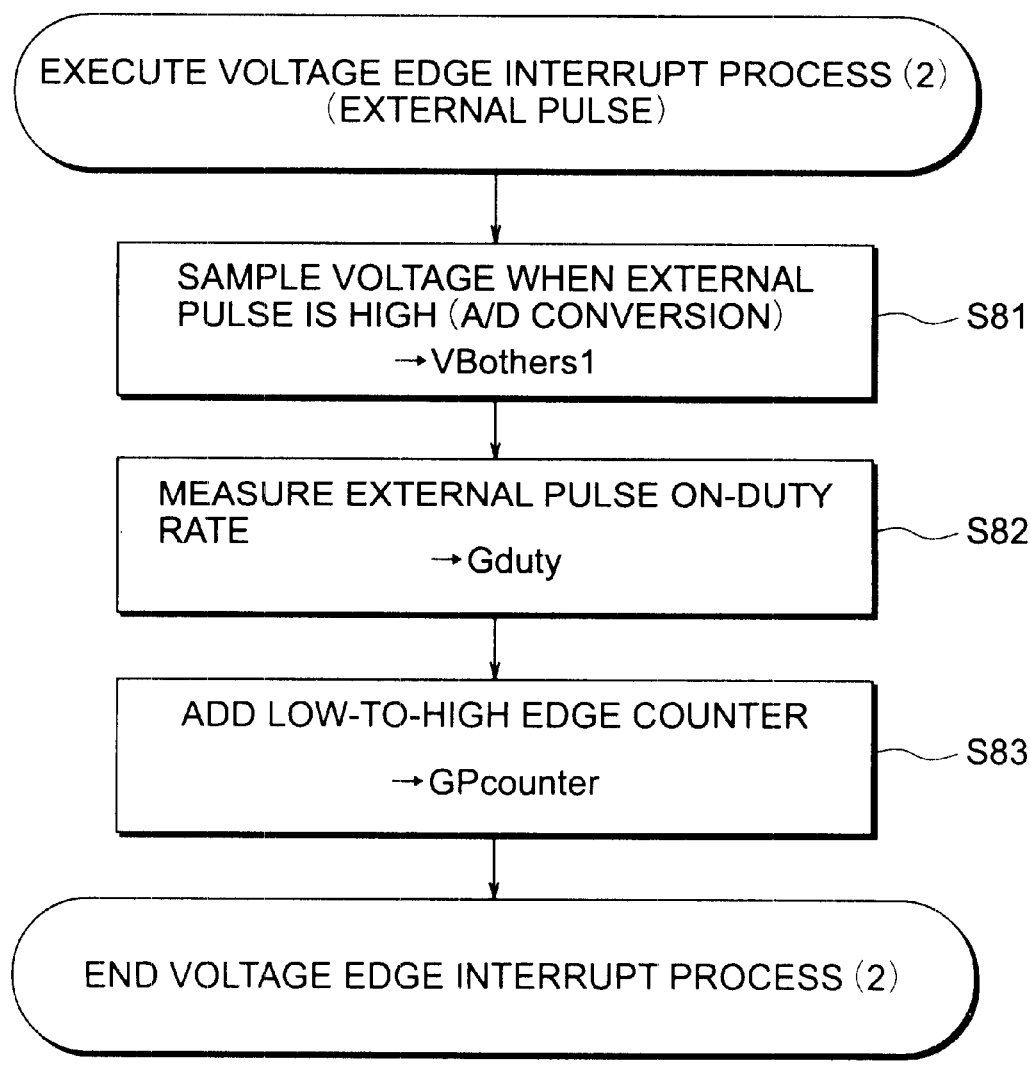
FIG. 10 is a flow chart for describing operations of the alternator voltage control apparatus according to embodiment 1 of the present invention.

Referring now to FIG. 9 and FIG. 10, a detailed description will be made of the voltage edge interrupt process operations (1) and (2) defined at the above-described steps S3 and S4 of the flow chart shown in FIG. 5.

First, in the voltage edge interrupt process operation (1) related to a voltage generated for the stator 1-phase shown in FIG. 9, an edge of the stator 1-phase generated voltage from a low level to a high level is added by the counter as a count value (PPcounter) at a step S71. Then, the microcomputer 10 samples the stator 1-phase generated voltage to be used as a VP (VALUE8) at a step S72, and thereafter accomplishes the voltage edge interrupt process operation (1).

Also, in the voltage edge interrupt process operation (2) related to the external pulse shown in FIG. 10, the microcomputer 10 samples such a voltage when the level of the external pulse is at a high level and then, sets this sampled voltage as VBothers1 at a step S81; measures an ON-duty rate (Gduty) of the external pulse at a step S82; adds an edge of the external pulse from a low level to a high level as a count value (GPcounter) by the counter at a step S83 and then accomplishes the voltage edge interrupt process operation (2).

As previously described, in accordance with embodiment 1, in the case that the alternator is controlled in order to feedback the generated voltage to the target voltage, the alternator voltage control apparatus does not need to employ the parameter and the equation made by the power generation characteristic of the alternator and the electromagnetic specification of the alternator. In other words, the parameter and the equation of the control apparatus are not required to be changed even when the power generation characteristic of the alternator and the electromagnetic specification thereof are changed. Also, the voltage control of the alternator can be carried out, while the energizing current is no longer calculated based upon the equations which are established based on the power generation characteristic of the alternator and the electromagnetic specification thereof and also this energizing current is no longer converted into the ON/OFF duty ratio. In other words, the alternator voltage control apparatus according to the present invention can own general-purpose characteristics adaptable to any alternator with various electromagnetic specifications.

Furthermore, the second ON/OFF logic in which both the ON-duty rate and the frequency are determined by the stable PWM operation may be determined only by the magnitude relationship between the target voltage and the generated voltage, and both the ON-duty rate and the frequency of the first ON/OFF logic in which both the ON-duty rate and the logic period are unstable are inducted/suppressed. As a result, both the ON-duty rate and the logic frequency of the ON/OFF logic used to apply the voltage to the energizing coil which constitutes the final control means are eventually made stable within a predetermined frequency range.

This is because the stable characteristic of the ON/OFF frequency of the voltage application to the energizing coil corresponds to the stable characteristic of the energizing coil current, namely the stable characteristic of the generated voltage of the alternator. In such a case that the ON/OFF frequency of the voltage application to the energizing coil is largely varied (namely, ON/OFF frequency is increased or decreased), and becomes excessively low, the energizing coil current is largely varied. As a result, the generated voltage of the alternator is brought into the unstable condition, for example, so that brightness of a head lamp, a room lamp, and an indoor panel lamp is fluctuated. In addition, since the alternator functions as the power supply source of the vehicle load, the unstable voltage generated from the alternator may give adverse influences on other electronic control units. Conversely, when the ON/OFF frequency becomes excessively high, other adverse influences may be given. That is, while the ON/OFF switching period of the semiconductor switch employed in the voltage regulator which may determine the voltage application to the energizing coil is high, the switching surge produced in conjunction with this semiconductor switch may produce unfavorable frequencies with respect to other electronic components. In the worst case, since this switching surge is reached to the radio frequency area, a so-called "radio noise" may be produced.

That is to say, there is no good condition when the ON/OFF frequency of the voltage application to the energizing coil of the regulator becomes excessively high and/or low. There is no question when regulators of alternators cannot satisfy the condition, while these alternators constitute power supply sources of modern automobiles on which a large number of electronic units are mounted. Originally, the conventional digital regulator owns the hidden purpose. That is, in order to fixedly determine the ON/OFF frequency of the voltage application to the energizing coil at a preselected frequency, both the ON-duty rate and the frequency are previously determined. Although this may achieve the large effect, the general-purpose characteristic of this conventional digital regulator would be deteriorated, namely the trade-off relationship exists. As a consequence, in accordance with embodiment 1, the ON/OFF frequency of the voltage application to the energizing coil is defined in a predetermined frequency range, resulting in improvements of the stability, by which such a demerit caused by the trade-off relationship could be eliminated.

Also, as to the magnitude logic obtained by comparing the target voltage with the voltage generated by the alternator, the logic inversion becomes the high frequency under such a condition that the generated voltage is approximated to the target voltage. In other words, every time the target voltage is compared with the voltage generated by the alternator, the logic is inverted. As a result, in order that the once determined logic is not inverted at once, the hysteresis correction is performed to this target voltage. In this embodiment, since this hysteresis correction amount is suitably changed based upon both the alternator rotation number and the alternator output strength, this hysteresis correction can be achieved under any operating condition of the alternator.

Furthermore, even when the electromagnetic specification of the alternator is changed and thus the output efficiency with respect to the rotation number is changed, another method is prepared. That is, in this alternative method, the hysteresis correction amount is changed in the feedback manner based upon the inverting frequency of the eventual magnitude logic (even when the present correction amount may cause the magnitude logic frequency to be excessively lowered, the correction amount is decreased by reflecting this result. Conversely, even when the present correction amount may cause the magnitude logic frequency to be excessively increased, the correction amount is increased). As a consequence, the hysteresis correction can be done irrespective of the electromagnetic specification of the alternator.

Even when only the hysteresis correction is introduced, the magnitude logic frequency obtained by comparing the target voltage with the voltage generated by the alternator may be suitably made stable. However, in such a case that the generated voltage is required to be controlled in more higher precision (satisfactory precision level could be achieved even only by hysteresis correction method of the present invention, as compared with the precision by the conventional method), there is a limitation in enlarging the hysteresis correction amount. In other words, the enlargement of the hysteresis correction amount for the target voltage directly appears as a fluctuated width of a generated voltage. In accordance with this embodiment, the logic invention suppressing means capable of achieving the same effect is prepared in addition to the hysteresis correction. That is to say, while the logic continuous counters are separately provided in the respective logics, the suppression is made such that the logic cannot be inverted unless the counter is satisfied.

Furthermore, the suppression strength with respect to the large judgement logic is made different from the suppression strength with respect to the small judgement logic. In particular, the suppression strength is weakened as to the logic for such a side that the voltage application to the energizing coil should be turned OFF. This is because the response characteristic for the rapid load interruption is improved. Also, while such a feedback correction similar to the feedback correction of the hysteresis correction amount is prepared, the different point is given as follows: That is, while the above-described response characteristic may be similarly improved in this feedback correction, only the suppression strength for such a side that the voltage application to the energizing coil should be turned ON may be increased/decreased. Similar to the hysteresis correction, the object can be achieved irrespective of the electromagnetic specification of the alternator.

In addition to such an operation that the frequency of the first ON/OFF logic is approximated to the frequency of the second ON/OFF logic, the frequency of the second ON/OFF logic is approximated to the frequency of the first ON/OFF logic at the same time (within a range of target energizing coil ON/OFF frequency), so that the load of the hysteresis correction can be reduced.

Also, in this embodiment, since the filter essentially realized by the software is provided, the following means could be avoided. That is, a capacitor having a large capacity is provided before sampling operation, and also a complex-structured filter circuit such as a differential filter and an integral filter is arranged. Also, since the filtering strength of such a software filter may be adjusted by the output strength of the alternator and the rotation number of the alternator in an optimum manner, the following difficulty can be avoided. That is, similar to the conventional digital regulator, the feedback control is delayed without any clear reason. It should be noted that the ripple variation width may depend upon the output strength of the alternator. Also, the ripple frequency may depend upon the rotation number of the alternator. As a result, the filter strength is adjusted by both the output strength and the rotation number. Apparently, when the ripple component is small, the filter strength may be made weak. When the ripple component is large and also the frequency is low, the filter strength may be especially increased. In other words, the large capacity of the capacitor, which is similar to the conventional digital regulator, is changed in response to the ripple components.

When the ripple component is synchronized with the sampling period, even if the software filter may own the superior filtering characteristic, the effective generated voltage of the alternator cannot be obtained. When the summit portion of the ripple component is synchronized with the sampling period, if the generated voltage becomes excessively high, then the ripple component is fed back, so that the control voltage is lowered by the magnitude of the ripple component. When the ripple component is synchronized with the sampling period at the bottom portion of the ripple component, the control voltage is conversely increased by the magnitude of the ripple component. However, according to this embodiment, this problem can be solved by employing the below-mentioned manner. That is, the sampling frequency that is not synchronized with the ripple frequency is calculated based upon the alternator rotation number, or is properly changed by retrieving the content of the table.

Also, the alternator voltage control apparatus is provided with the sampling means capable of reducing the work load given to the microcomputer. That is, since the generation timing of one sample is captured, the continuous sampling operation is no longer required (although no adverse influence is given to the feedback response characteristic). Thereafter, while the ripple shape is predicted, the effective generated voltage can be predicted with the minimum sampling number. As a result, the density of the sampling process operations is reduced also in the program progress of the microcomputer, so that the computer program can be easily developed, and also the operating clock frequency can be dropped. This may possibly contribute to the low cost of the microprocessor and of the crystal oscillation element. The generation timing of one ripple may be grasped based upon the generation timing of the voltage waveform for the stator 1-phase of the alternator.

Also, such a voltage control apparatus for controlling the voltage at the output terminal of the alternator necessarily owns the following drawback (namely, drawback of the alternator voltage sensing voltage control apparatus). That is, the more the output current is increased, the lower the voltage at the battery terminal is decreased due to the voltage drop in the recharging line. Thus, there is a voltage shift with respect to the battery accept voltage. However, in accordance with this embodiment, this voltage shift is corrected, and therefore, performance equivalent to a so-called battery voltage sensing regulator can be achieved. As the voltage of the external signal input terminal, any type of signal lines may be used as far as the voltage related to the battery voltage other than the terminal voltage of the alternator can be derived from such signal lines. These signal lines need not be such a signal line dedicated to extract the battery voltage, but also may be selected from a communication line and a warning lamp drive line.

Normally, in order to predict the output strength of the alternator, the ON-duty rate of the voltage application to the energizing coil is employed. The application voltage to the energizing coil is equal to the generated voltage of the alternator. This generated voltage is changed due to the temperature characteristic and the external factor. Therefore, there is such a problem that better prediction precision cannot be obtained only by the ON-duty rate. In this embodiment, since the ON-duty rate is converted into the effective application voltage to the energizing coil to be interpreted, the prediction precision can be improved.

Also, in order to predict the drive torque of the alternator, there is such a case that the ON/OFF switching waveform of the voltage application to the energizing coil is inputted into the ECU. However, in the case of such a voltage control apparatus that the ON/OFF waveform of the voltage application to the energizing coil is not stable as to both the frequency and the ON-duty rate, the ECU can hardly recognize the ON-duty rate in the digital manner. If the upper limit frequency is not restricted, then no one can grasp when the measuring operation of the ON/OFF set time (time period) is ended. As a result, the measurement timer of the ECU may be brought into the overflow state. In accordance with this embodiment, since both the frequency and the ON-duty rate have already been stabilized to produce the stable PWM output, the ECU can readily recognize the ON-duty rate in the digital manner, so that both the software and the hardware can be readily developed. Also, when this frequency is employed as the standard frequency in the same product, the compatibility on the digital recognition can be achieved.

Also, even if the ECU readily acquires the ON-duty rate of the voltage application to the alternator energizing coil by employing the above-described method, the voltage which is actually applied to the energizing coil corresponds to the generated voltage of the alternator. Since the generated voltage depends upon the regulator temperature, if the drive torque is predicted only by the ON-duty, then a shift is produced.

In accordance with this embodiment, since the ON duty of the energizing coil is converted into the application voltage to the energizing coil so as to obtain the PWM output, the ECU can predict the suitable drive torque of the alternator at this time irrespective of the control voltage. Similarly, since the voltage control apparatus has already stabilized both the frequency and the ON-duty indicative of the converted application voltage to output the PWM output, the ECU can readily recognize the ON-duty rate in the digital manner, so that both the software and the hardware can be readily developed. Also, when this frequency is employed as the standard frequency in the same product, the compatibility on the digital recognition can be achieved.

Further, in order to predict the drive torque of the alternator, the reason why both the ON-duty of the voltage application to the energizing coil and the converted application voltage to the energizing coil are employed is to actually acquire the energizing coil current. The converted application voltage to the energizing coil is better than that of the prior art. However, since the resistance component of the energizing coil depends upon the temperature, even when the converted application voltage is obtained, there is a shift in the prediction of the energizing coil current.

However, in accordance with this embodiment, the PWM output is obtained which depends upon the current flowing through the energizing coil. As a result, the shift is no longer present when the ECU predicts the drive torque of the alternator. In this case, similarly, since the voltage control apparatus has already stabilized both the frequency and the ON-duty indicative of the energizing current to output the PWM output, the ECU can readily recognize the ON-duty rate in the digital manner, so that both the software and the hardware can be readily developed. Also, when this frequency is employed as the standard frequency in the same product, the compatibility on the digital recognition can be achieved.

Actually, a relationship between an energizing current and a drive torque depends upon an alternator rotation number, and a coefficient of this alternator is changed, depending upon an alternator output class and an electromagnetic specification. As a result, the ECU is required to change the interpretation of the drive torque every alternator. In accordance with this embodiment, more specifically, when such a PWM output indicative of the absolute value of the alternator drive torque is produced, the ECU can truly recognize the drive torque of the alternator without changing the table content irrespective of the alternator output class and the electromagnetic specification (if being standardized, then irrespective of a sort of manufacturer). No longer an error as well as a shift occurs. In this case, similarly, since the voltage control apparatus has already stabilized both the frequency and the ON-duty indicative of the energizing current to output the PWM output, the ECU can readily recognize the ON-duty rate in the digital manner, so that both the software and the hardware can be readily developed. Also, when this frequency is employed as the standard frequency in the same product, the compatibility on the digital recognition can be achieved.

Also, the ECU can simultaneously acquire both the information related to the alternator drive torque and the diagnostic information related to the regulator only by monitoring the frequency of the third PWM output of the regulator, the ON-duty rate, or the ON time.

If the voltage control apparatus inputs the external pulse signal, then two sets of information, namely both the frequency and the ON duty can be extracted. For instance, the frequency may represent a target voltage instructed to an external unit, and the ON-duty may indicate a battery voltage recognized by the external unit. In the case that an alternator introduces a voltage control by an alternator voltage sensing, battery voltage information about an extraction point other than an alternator may be very effectively used. The information which is superimposed on the external pulse is not limited to these two subjects, but other effective information required to control the power generation of the alternator may be employed. Also, if only one information is satisfactorily usable, the external unit no longer constitutes the ON duty. As a result, since the external unit may be driven by an one-shot pulse, the external unit may be easily arranged, and further, the regulator may be readily arranged. Also, when the one-shot pulse is employed, this one-shot pulse can be recognized by way of the FV conversion even by the conventional analog regulator.

Also, in such a voltage control apparatus mounted on an alternator, what action can trigger an initiation of a power supply, and what action can trigger an interruption of a power supply should be considered. Normally, in the prior art voltage control apparatus, there is no problem, because a signal line related to a key ON/OFF operation by a car driver as to an ignition power supply, a warning lamp power supply etc. is utilized so as to initiate the power supply and also to interrupt the power supply. When these signal line actions are not present, a new trigger item must be extracted. In this embodiment, the logic inversion of the communication line between the external unit and the voltage control apparatus is utilized as the initiation trigger item. This communication line may include the external pulse signal and also a complex digital communication line (SCI, LAN, CAN, ]).

When the trigger action by the communication line is used to interrupt the power supply, another problem may occur. There are some possibilities that the communication line is disconnected while the power supply is initiated. Only when the communication line is disconnected, if the alternator stops the power generation, then this may cause a problem in view of a fail safe. As a consequence, this embodiment introduces another method for interrupting the power supply. That is, when the alternator continues the initial energizing condition for a predetermined time duration, or the alternator judges that the alternator rotation number is equal to zero and this initial energizing condition is continued, the power supply interruption is carried out.

What is claimed is:

1. A voltage control apparatus of an alternator, for controlling a voltage generated by the alternator to a predetermined voltage value by turning ON/OFF a voltage applied to an energizing coil of the alternator, comprising:

first logic output means for comparing the voltage generated by the alternator with a target voltage to obtain a magnitude logic which is outputted as a first ON/OFF logic; and second logic output means for outputting as a second ON/OFF logic, a PWM internal output logic in which an ON-duty rate is increased/decreased based on said first ON/OFF logic by an increased/decreased amount defined by considering a time constant of the energizing coil; wherein:

a logically processed result between said first ON/OFF logic and said second ON/OFF logic is used as an ON/OFF logic of a voltage application to said energizing coil.

2. An alternator voltage control apparatus as claimed in claim 1 wherein:

said target voltage is hysteresis-corrected along a direction to hold a magnitude logic obtained by comparing said target voltage with the generated voltage of the alternator; said hysteresis correction amount is changed based on a parameter related to an alternator rotation number and an alternator output strength; and also said hysteresis correction amount is changed in a feedback manner based on an inversion period of said first ON/OFF logic.

3. An alternator voltage control apparatus as claimed in claim 1 wherein:

said first logic output means is provided with logic inversion suppressing means by which said first ON/OFF logic is hardly inverted;

a suppression strength of said logic inversion suppressing means for an ON logic to an OFF logic is made different from a suppression strength of said logic inversion suppressing means for an OFF logic to an ON logic; and said suppression strengths are changed in a feedback manner in response to a resulting logic period of said first ON/OFF logic.

4. An alternator voltage control apparatus as claimed in claim 1 wherein:

the logic period of the PWM internal output which constitutes said second ON/OFF logic is changed by executing a calculation based on the parameter related to both the alternator rotation number and the alternator output strength and by retrieving a content of a table; or is changed based on the period of said first ON/OFF logic.

5. An alternator voltage control apparatus as claimed in claim 1 wherein:

said alternator voltage control apparatus is further comprised of:

storage means for storing thereinto a plurality of alternator generated voltages as sampling values, which have been sampled in the past; and calculation means for performing a move average calculation based on the latest sampling value and the plural past sampling values to interpret the move-averaged sampling value as a presently generated voltage;

a total referring number of said past sampling values is changed based on the alternator rotation number and the alternator output strength; said total referring number of the past sampling values used in said move average calculation is equal to power of 2; and a total number of referring sampling values is interpreted by a binary number so as to obtain a section average value by bit-shifting along a right direction by said total referring number.

6. An alternator voltage control apparatus as claimed in claim 1 wherein:

said generated voltage of the alternator is sampled by a sampling operation whose sampling period is changed.

7. An alternator voltage control apparatus as claimed in claim 6 wherein:

said sampling period is calculated based upon said alternator rotation number, or by retrieving the content of the table.

8. An alternator voltage control apparatus as claimed in claim 6 wherein:

said sampling operation is commenced by triggering the generation timing of the voltage waveform for one stator phase of said alternator;

said sampling operation is intermittently carried out in a predetermined time period only for a predetermined time duration after the commencement of the sampling operation; and both said predetermined time period and said predetermined time duration are calculated based upon the trigger interval up to now, or are determined by retrieving a content of a table.

9. An alternator voltage control apparatus as claimed in claim 2 wherein:

said alternator voltage control apparatus is further comprised of:

calculation means for calculating said alternator rotation number based upon a time interval of a transition edge from "Low" to "High" of a voltage waveform for a stator 1-phase of said alternator.

10. An alternator voltage control apparatus as claimed in claim 1 wherein:

said target voltage is shifted by an amount conducted by retrieving a content of a table and by executing a calculation based upon a parameter related to an alternator rotation number and an alternator output strength; or said target voltage is regularly corrected based upon deviation between a voltage appearing at an alternator output terminal, a voltage appearing at an external signal input terminal, and information indicative of a battery voltage derived from an external unit.

11. An alternator voltage control apparatus as claimed in claim 1 wherein:

increasing/decreasing of an ON-duty rate of a PWM internal output which constitutes said second ON/OFF logic is suppressed based on an increase/decrease amount per unit time, defined by considering a time constant of said energizing coil;

a suppression strength of said increase amount per unit time is set stronger than the time constant of said energizing coil; and further is changed, or prohibited based upon the alternator rotation number;

the suppression of said increase/decreased amount per unit time is prohibited, or released based on a specific power generation mode of said alternator; and both an upper limit value and a lower limit value are set to said ON-duty rate based upon the alternate rotation number and the unit temperature.

12. An alternator voltage control apparatus as claimed in claim 1 wherein:

said ON/OFF logic of the voltage application to said energizing coil is forcibly set to the logic ON based upon either a peak voltage or an average voltage of voltage waveforms for a stator 1-phase of said alternator irrespective of the logically processed result between said first ON/OFF logic and second ON/OFF logic.

13. An alternator voltage control apparatus as claimed in claim 1 wherein:

either a multiplied value or an ON-logic rate per unit time of the ON/OFF logic of the voltage application to said energizing coil is interpreted as an ON-duty rate of the voltage application to said energizing coil; and, said multiplied value is obtained from both an ON-logic rate within one logic period of said first ON/OFF logic and an ON-logic rate within one logic period of said second ON/OFF logic.

14. An alternator voltage control apparatus as claimed in claim 13 wherein:

said alternator voltage control means is further comprised of:

calculation means for calculating an effective voltage applied to said energizing coil based upon said ON-duty rate of the voltage application to said energizing coil and a voltage generated by said alternator at this time.

15. An alternator voltage control apparatus as claimed in claim 1 wherein:

both an output strength of said alternator and a drive torque strength of said alternator are predicted by retrieving a content of a table or by performing a calculation, while using an upper/lower width and a voltage magnitude of a voltage ripple produced at an alternator output terminal as a parameter, by retrieving a content of a table and/or by executing a calculation, while using voltage deviation as a parameter, said voltage deviation between a voltage of an alternator output terminal and a voltage of an external signal input terminal, which are produced by a voltage drop of a recharging line, or by retrieving a content of a table or performing a calculation, while using as a parameter, an ON-duty rate of the voltage application to said energizing coil, a converted voltage applied to said energizing coil, and the alternator rotation number.

16. An alternator voltage control apparatus as claimed in claim 1 wherein:

said alternator voltage control means is further comprised of:

PWM output means for indicating an ON-duty rate of a voltage applied to said energizing coil, an effective voltage applied to said energizing coil, an output strength of said alternator, a drive torque strength of said alternator, or such an ON-duty rate which depends upon a rate of an energizing current itself of said energizing coil and an absolute value of said energizing current.

17. An alternator voltage control apparatus as claimed in claim 16 wherein:

the output of said PWM output means contains a predetermined basic frequency; said predetermined basic frequency is changed based upon self-diagnostic information of the voltage control apparatus; even when said basic frequency is changed, the ON-duty rate indicated when said basic frequency is present is not changed; or even when said basic frequency is changed, there is no change in ON time defined by the ON-duty rate indicated when said basic frequency is present.

18. An alternator voltage control apparatus as claimed in claim 1 wherein:

said alternator voltage control apparatus is further comprised of:

an interface used to recognize a voltage related to a battery voltage, and an instruction of the target voltage to an external unit based on a frequency of a pulse signal supplied from said external unit, or both said frequency and a duty.

19. An alternator voltage control apparatus as claimed in claim 1 wherein:

a power supply interrupt of said voltage control apparatus is executed by judging such a fact that said alternator continues an initial energizing condition for a predetermined time period, or such a fact that said alternator continues the initial energizing condition for a preselected time period and further an alternator rotation number is equal to zero.

20. An alternator voltage control apparatus as claimed in claim 1 wherein:

an initiation of a power supply of said voltage control apparatus is executed by using as a trigger, a logic inversion of an information communication line connected to an external unit.

* * * * *